(12) United States Patent
Juarez

(10) Patent No.: US 11,143,163 B2
(45) Date of Patent: Oct. 12, 2021

(54) VERTICAL AXIS WIND TURBINE

(71) Applicant: Ignacio Juarez, San Jose, CA (US)

(72) Inventor: Ignacio Juarez, San Jose, CA (US)

(73) Assignee: Semtive Inc., Austin, TX (US)

(*) Notice: Subject to any disclaimer, the term of this patent is extended or adjusted under 35 U.S.C. 154(b) by 0 days.

(21) Appl. No.: 16/083,157

(22) PCT Filed: Mar. 8, 2017

(86) PCT No.: PCT/US2017/021373
§ 371 (c)(1),
(2) Date: Sep. 7, 2018

(87) PCT Pub. No.: WO2017/156135
PCT Pub. Date: Sep. 14, 2017

(65) Prior Publication Data
US 2019/0093629 A1    Mar. 28, 2019

Related U.S. Application Data

(60) Provisional application No. 62/305,460, filed on Mar. 8, 2016.

(51) Int. Cl.
*F03D 9/25*    (2016.01)
*F03D 3/06*    (2006.01)
(Continued)

(52) U.S. Cl.
CPC ............ *F03D 3/062* (2013.01); *F03D 3/005* (2013.01); *F03D 3/061* (2013.01); *F03D 9/25* (2016.05); *H02K 7/183* (2013.01); *F05B 2230/20* (2013.01); *F05B 2230/26* (2013.01); *F05B 2240/211* (2013.01); *Y02E 10/74* (2013.01); *Y02P 70/50* (2015.11)

(58) Field of Classification Search
None
See application file for complete search history.

(56) References Cited

U.S. PATENT DOCUMENTS 1,766,765 A    6/1930    Savonius
3,944,782 A *  3/1976    Metcalfe ............... B21B 45/004
                                                      219/152

(Continued)

FOREIGN PATENT DOCUMENTS

EP    2039929 A1    3/2009
EP    2594784 A2    5/2013
(Continued)

OTHER PUBLICATIONS

Ragheb, M.; Vertical axis wind turbines; University of Illinois at Urbana-Champaign; 1; 40 pages; Aug. 1, 2011.
(Continued)

*Primary Examiner* — Michael Lebentritt
(74) *Attorney, Agent, or Firm* — Shay Glenn LLP

(57) ABSTRACT

The present device is a vertically oriented wind turbine blade having a rectangular simple curvilinear shaped blade, which includes a top edge, a bottom edge, an outer edge, an inner edge, an inner surface and an outer surface. The blade is curved using a series of bent section to approximate as airfoil shape from the inner edge to the outer edge (relative to the turbine center or hub).

30 Claims, 37 Drawing Sheets

(51) Int. Cl.
*F03D 3/00* (2006.01)
*H02K 7/18* (2006.01)

(56) References Cited

U.S. PATENT DOCUMENTS

| | | | |
|---|---|---|---|
| 4,291,235 A | 9/1981 | Bergey et al. | |
| 4,318,019 A | 3/1982 | Teasley et al. | |
| 4,417,853 A * | 11/1983 | Cook | F03D 1/00 416/132 B |
| 4,449,053 A * | 5/1984 | Kutcher | F03D 9/25 290/44 |
| 4,866,321 A | 9/1989 | Blanchard et al. | |
| 4,915,580 A | 4/1990 | Obidniak | |
| 4,976,587 A * | 12/1990 | Johnston | B64C 27/473 416/226 |
| 5,021,698 A | 6/1991 | Pullen et al. | |
| 5,601,951 A | 2/1997 | Johnson et al. | |
| 6,242,818 B1 | 6/2001 | Smedley | |
| 6,448,669 B1 | 9/2002 | Elder | |
| 6,533,986 B1 * | 3/2003 | Fosaaen | B28B 3/003 264/314 |
| 7,084,523 B2 | 8/2006 | Noguchi | |
| 7,218,974 B2 | 5/2007 | Rumi et al. | |
| 7,274,975 B2 | 9/2007 | Miller | |
| 7,404,700 B1 * | 7/2008 | Spanks, Jr. | F01D 5/282 416/241 A |
| 7,561,977 B2 | 7/2009 | Horst et al. | |
| 7,744,338 B2 | 6/2010 | DeRuyter et al. | |
| 8,272,843 B1 * | 9/2012 | Ryznic | F01D 5/282 416/241 A |
| 8,487,470 B2 | 7/2013 | Grassman | |
| 8,550,786 B2 | 10/2013 | Janiuk | |
| 8,612,058 B2 | 12/2013 | Khajehoddin et al. | |
| 8,678,324 B2 * | 3/2014 | Hemmelgarn | B64C 3/48 244/219 |
| 8,680,705 B2 | 3/2014 | Pujol Artigas | |
| 8,894,373 B2 | 11/2014 | Firic | |
| 8,994,201 B2 | 3/2015 | Farley | |
| D738,305 S | 9/2015 | Gochev | |
| 9,404,474 B2 | 8/2016 | Watanabe | |
| 9,770,791 B2 * | 9/2017 | Hong | B64F 5/40 |
| 2008/0283118 A1 | 11/2008 | Rotzoll et al. | |
| 2009/0068018 A1 * | 3/2009 | Corten | F03D 7/0256 416/223 R |
| 2009/0074574 A1 * | 3/2009 | Godsk | F03D 1/0641 416/41 |
| 2009/0206666 A1 | 8/2009 | Sella et al. | |
| 2009/0251002 A1 | 10/2009 | Cohen et al. | |
| 2009/0257884 A1 * | 10/2009 | Clark | F03D 1/0641 416/243 |
| 2011/0057452 A1 | 3/2011 | Interlandi et al. | |
| 2011/0089698 A1 | 4/2011 | Ahmadi | |
| 2011/0194938 A1 | 8/2011 | Livingston | |
| 2012/0170325 A1 | 7/2012 | Jin et al. | |
| 2013/0049512 A1 | 2/2013 | Jung | |
| 2013/0068888 A1 * | 3/2013 | Smith | F01D 5/282 244/124 |
| 2013/0287591 A1 | 10/2013 | Plourde et al. | |
| 2014/0030094 A1 * | 1/2014 | Dahl | B29C 70/885 416/217 |
| 2014/0205462 A1 | 7/2014 | Gochev | |
| 2015/0155825 A1 | 6/2015 | Sella et al. | |
| 2015/0211483 A1 | 7/2015 | Brendle et al. | |
| 2015/0233353 A1 | 8/2015 | Bertony | |
| 2015/0345473 A1 * | 12/2015 | Bardia | H02K 7/114 290/44 |
| 2016/0009034 A1 * | 1/2016 | Moors | B29C 70/48 264/511 |
| 2016/0087444 A1 | 3/2016 | Ottolini | |
| 2016/0115939 A1 * | 4/2016 | Shair | F03D 13/10 416/229 A |
| 2016/0164295 A1 | 6/2016 | Cheng et al. | |
| 2016/0176305 A1 | 6/2016 | James et al. | |
| 2016/0241039 A1 | 8/2016 | Cheng et al. | |
| 2016/0279867 A1 * | 9/2016 | Garm | B29C 65/5042 |
| 2016/0279899 A1 * | 9/2016 | Cantwell | B32B 7/08 |
| 2016/0312763 A1 * | 10/2016 | Arce | F03D 1/0633 |
| 2017/0015407 A1 * | 1/2017 | Garver | B64C 23/02 |
| 2017/0074241 A1 * | 3/2017 | Koike | F03D 1/0675 |
| 2017/0096985 A1 * | 4/2017 | Bardia | F03D 9/007 |
| 2017/0180134 A1 | 6/2017 | King | |
| 2017/0284363 A1 * | 10/2017 | Harrison | F03D 1/0675 |
| 2018/0100484 A1 | 4/2018 | Deioma | |
| 2018/0292090 A1 * | 10/2018 | Dyer | F23R 3/007 |
| 2018/0347541 A1 * | 12/2018 | Kudsk | F03D 1/0675 |
| 2019/0078553 A1 * | 3/2019 | Chen | F03D 3/062 |
| 2019/0195191 A1 * | 6/2019 | Girolamo | F03D 1/0675 |
| 2019/0242399 A1 * | 8/2019 | Kray | F01D 5/282 |
| 2019/0277247 A1 * | 9/2019 | Kratmann | F03D 80/00 |
| 2019/0309733 A1 * | 10/2019 | Grishauge | B29C 64/393 |

FOREIGN PATENT DOCUMENTS

| | | |
|---|---|---|
| WO | WO2009/111355 A2 | 9/2009 |
| WO | WO2014/090219 A2 | 6/2014 |
| WO | WO2014/152073 A2 | 9/2014 |
| WO | WO2014/175755 A1 | 10/2014 |
| WO | WO2014/187912 A2 | 11/2014 |
| WO | WO2014/192015 A2 | 12/2014 |
| WO | WO2015/065291 A1 | 5/2015 |
| WO | WO2015/086872 A1 | 6/2015 |
| WO | WO2015/155782 A1 | 10/2015 |
| WO | WO2015/166477 A1 | 11/2015 |

OTHER PUBLICATIONS

Juarez; U.S. Appl. No. 16/494,522, entitled "Micro inverter and controller," filed Sep. 16, 2019.

* cited by examiner

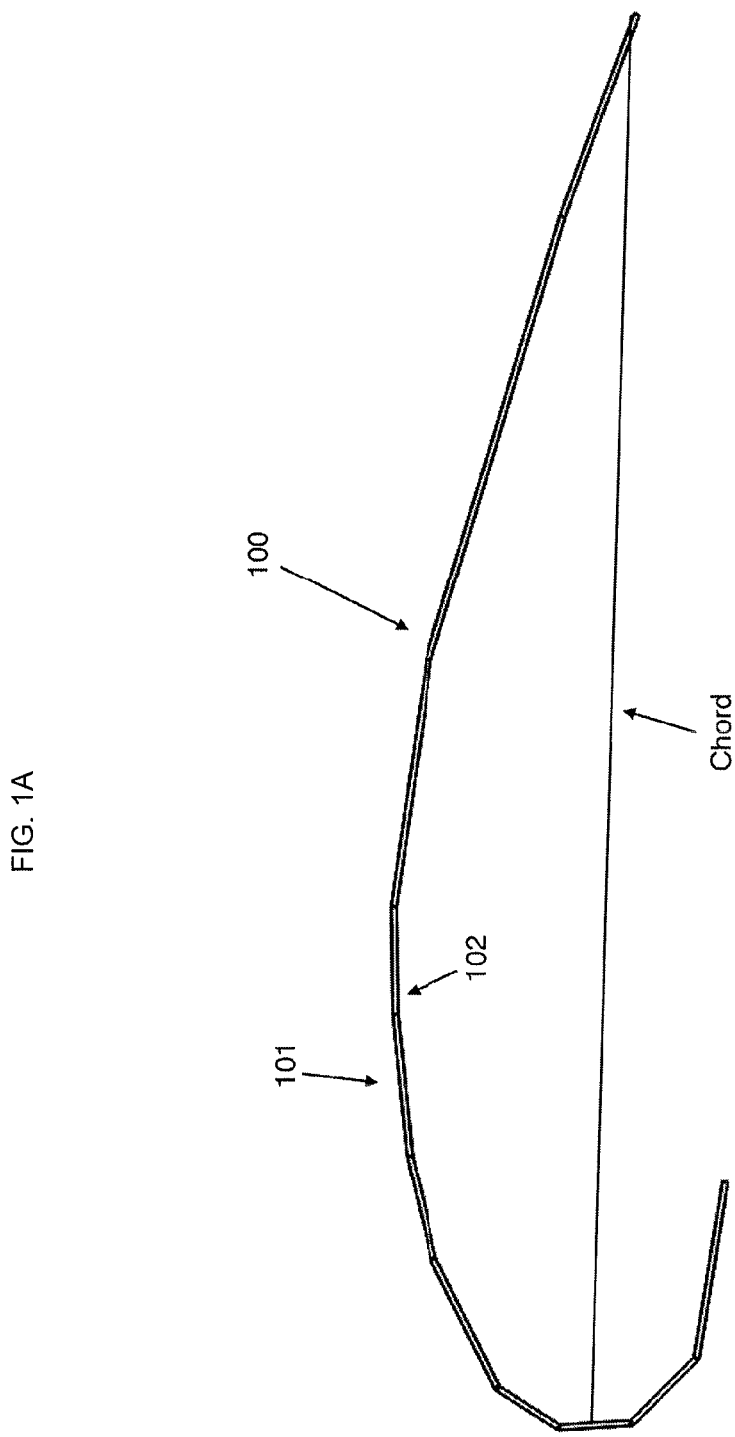

VERTICAL AXIS WIND TURBINE

CROSS REFERENCE TO RELATED APPLICATIONS

This application claims the benefit of U.S. Provisional Patent Application No. 62/305,460, filed on Mar. 8, 2016.

INCORPORATION BY REFERENCE

All publications and patent applications mentioned in this specification are herein incorporated by reference to the same extent as if each individual publication or patent application was specifically and individually indicated to be incorporated by reference.

FIELD

The present invention relates to wind turbines, in particular, to wind turbine blade technology.

BACKGROUND

Historically numerous wind turbines have been designed and deployed using various designs. The major drawback with all of these designs is the complexity used in order to create the wind turbine and the cost involved with manufacturing and deployment of the wind turbines in the field.

Currently many wind turbines require complex mechanical devices in order to ensure that the turbine is oriented in the correct direction. One of the advantages of the current design is that regardless of the direction of the wind the wind turbine will effectively produce power.

SUMMARY

In one aspect, embodiments of an airfoil for use in a wind turbine are provided. The airfoil comprises a rectangular blade shaped for a vertical axis wind turbine, the blade comprising one or more sheets of material including a top edge, a bottom edge, an outer edge, an inner edge, an inner surface and an outer surface wherein the blade comprises at least three bends extending from the top edge to the bottom edge so that the bent sheet of material approximates an airfoil shape without any internal structure.

The bends can be formed by at least one of bending, bump pressing, and rolling the sheet of material. Each of the at least three bends can comprise an angle less than about 20°. Each bend of the at least three bends can be spaced no more than about 10 cm from an adjacent bend. The blade can comprise no more than 8 bends. The length from the top edge to the bottom edge can be about 30 to about 6000 cm. The rectangular blade can be formed from a single piece of material. The leading edge can be curved towards the center of the turbine. The airfoil can comprise a rectangular shaped slat shaped into a curve and mounted so as to place the slat proximate to a leading edge of the rectangular blade. An angle between the slat and the blade can be about 0-12 degrees. The slat can comprise a sheet with at least three bends. The slat can comprise a sheet with at least three bends. The slat can comprise a sheet with at least three bends. The airfoil can comprise a rectangular shaped flap mounted at a trailing edge of the blade. The blade can comprise at least one of steel, aluminum, carbon fiber, fiber glass, and plastic. The blade can be formed of 2 sheets of material. The airfoil can comprise a winglet along the upper edge and extending from the inner edge to the outer edge. The airfoil can comprise a lower winglet along the lower edge and extending from the inner edge to the outer edge.

In some embodiments, a wine turbine including at least one turbine blade as described above is provided. The turbine blade is mounted to a vertical rotor shaft with at least one transversely oriented strut such that an approximately curvilinear portion proximate to the outer edge defines the outer diameter of the turbine and the blade revolves about the rotor shaft. The rotor shaft can be connected to a generator. The generator can be a radial flux or an axial flux generator.

The airfoil can comprise one or more curves extending from the top edge to the bottom edge. The bends can be spaced less than about 1 mm apart to approximate a curve.

In another aspect, a wind turbine blade is provided. The blade comprises a top edge, a bottom edge, an outer edge, an inner edge wherein the blade comprises a plurality of bends or curves extending from the top edge to the bottom edge, the plurality of bends or curves forming an airfoil shape, the blade lacking any internal structure, the blade comprising a leading edge formed by the inner edge, a trailing edge formed by the bottom edge and a midsection between the inner edge and the trailing edge.

The blade can comprise at least one of a winglet along the top edge and extending from the inner edge to the outer edge and; and a lower winglet along the bottom edge and extending from the inner edge to the outer edge. A wind turbine can include the above described blade and be mounted to a vertical rotor shaft with at least one transversely oriented strut such that the leading edge defines the outer diameter of the turbine and the blade revolves about the rotor shaft. The rotor shaft can be connected to a generator. The generator can be a radial flux or an axial flux generator.

The wind turbine blade can have an angle between bends in the leading edge is about 5 to 40 degrees. An angle between bends in the trailing edge can be about 1 to 10 degrees. An angle between bends in the midsection can be about 1 to 10 degrees. The leading edge can comprise about 2 to 20 bends. The midsection can comprise about 1 to 3 bends. The trailing edge can comprise about 1 to 3 bends. The blade can comprise a rectangular shaped slat shaped into or to approximate a curve and mounted so as to place the slat proximate to the leading edge. The slat can be positioned at an angle from about 0-18 degrees in relation to the leading edge of the blade. The slat can be positioned relative to the leading edge to provide a hybrid turbine for drag force operation at low wind speeds and lift force operations at high wind speeds.

A wind turbine having a blade described above can include three blades and slats arranged about a central vertical axis, wherein each of the slats are arranged relative to each of the blades so that at low wind speeds below about 8 MPH (3.6 m/s), the turbine operates in a drag force configuration and then at high wind speeds above, about 8 MPH (3.6 m/s), the turbine operates in a lift force operation. A wind turbine having a blade described above can include three blades and slats arranged about a central vertical axis wherein each of the slats are arranged relative to each of the blades to provide a vertical turbine that generates power using drag force operation in a first range of wind speeds and generates power using lift force operation in a second range of wind speeds. The first range of wind speeds can be about 0.5 MPH (0.22 m/s) to about 8 MPH (3.6 m/s). The second range of wind speeds can be about 8 MPH (3.6 m/s) to about 130 MPH (58.1 m/s). A length of the blade from the upper edge to the lower edge can be from about 15 inches (0.4 m) to about 20 feet (6.1 m). The blade can be formed from one or more rectangular sheets having a thickness from about 0.5 mm to 15 mm. The blade can comprise a flap attached to a blade inner surface or a blade outer surface to position the flap in relation to the trailing edge of the blade, the flap comprising a leading edge and a trailing edge. The flap trailing edge can be directed towards or away from the trailing edge of the blade. The flat trailing edge can be directed towards or away from the central vertical axis of the turbine.

A wind turbine comprising the blade described above can comprise three blades, a generator hub, supporting hardware to secure the three blades about the generator wherein each of the three turbine blades are formed from rectangular material having a length of about 30 to 6000 mm arranged in an enclosure having a volume of no more than 15 cubic meters. The enclosure can have a length, a width, and a height not to exceed 6000 mm. The enclosure can be a flat-packed array.

In another aspect, a method for producing a wind turbine blade is provided. The method comprises providing a sheet of material having a top edge, a bottom edge, an outer edge, an inner edge, an inner surface and an outer surface; and forming at least three bends extending from the top edge to the bottom edge so that the bent sheet of material approximates an airfoil shape without any internal structure.

Forming the bends can comprise at least one of bending, bump pressing, and rolling the sheet of material. Forming the bends can comprise forming an angle of less than about 20 degrees. The method can comprise assembling the vertical wind turbine blade with other components to form a vertical wind turbine. Assembling can comprise connecting the components. The components can be provided in a flat-packed container. In another aspect, a method of manufacturing one or more blades for a wind turbine is provided. The method comprises selecting a sheet of material having a length and width sized for producing a wind turbine blade having a blade height approximately equal to the length of the sheet and a blade width about 50-90% of the width of the sheet; creating a series of at least one of bends and curves positioned along the width of the sheet and extending along the length of the material in the sheet of material to form a leading edge of the turbine blade in the sheet of material; and repeating the selecting and creating until a desired number of blades are formed.

Creating the series of bends can comprise forming a trailing edge of the turbine blade in the sheet of material. Creating the series of bends can comprise forming a mid-section between the trailing edge and the leading edge. Creating the series of bends can comprise at least one of pressing, stamping, bending, and rolling. The blade can be assembled into a vertical axis wind turbine with a cylindrical envelope having a height approximately equal to the height of the sheet and a circumference at least three times the blade width.

BRIEF DESCRIPTION OF THE DRAWINGS

FIGS. 1A-1E illustrates an embodiment of a wind turbine blade.

DETAILED DESCRIPTION

Figure 1B:
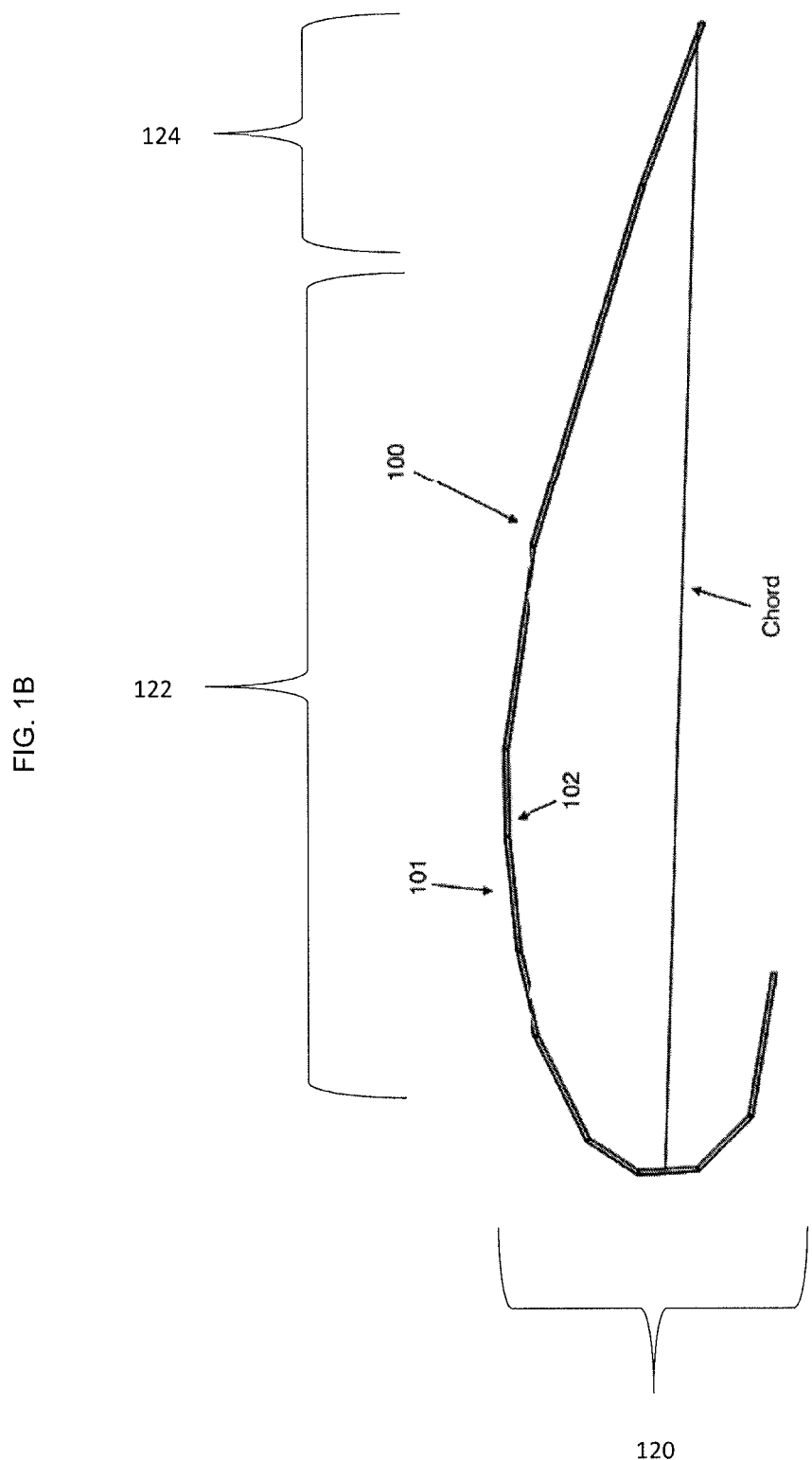

This application provides various embodiments of vertical wind turbine blades. The turbine can have mirror arms configuration through the horizontal axis, where the blades are fixed. The blades can be mounted concentrically in a vertical axis. The number of blades and arms in each turbine can vary. Each blade is designed as half of an airfoil, generating a convex side that produces lift at high wind speeds and a concave side that produces starting torque at low wind speeds. In some embodiments, a turbine configuration will include a slat that can increase the effective angle of each blade, increasing the torque and power of the turbine at low wind speeds. In still other configurations, a blade with a slat and a flap can also generates high drag at high wind speeds, braking the turbine itself and limiting working RPMs. The use, number, size and angle of the slats and/or flaps may vary, depending of the average wind speed in the area or the desired power output. Blades, slats, flaps and arms can be manufactured by bending, press, extrude, thermoform, injected, 3D printed or milled in different materials like aluminum, plastic, wood, steel or composites.

Traditionally such vertical wind turbines utilize blades shaped as airfoils. Such airfoils are generally produced using the same manufacturing techniques as airplane wings or propellers. Such a process is very expensive and time consuming as such components require very precise specifications to enable their function and to ensure safety. Additionally, airfoils generally comprise complex internal structure, making manufacturing of the precise configuration more difficult and making shipping very expensive as the structure can be very large and heavy. The turbine blades disclosed herein differ in that they can use a simpler manufacturing process, comprising, for example, bending or pressing a sheet of material, to approximate the shape of an airfoil. Additionally, the turbine blades disclosed herein approximate the outer shape of an airfoil, but do not include any complex internal structure. The simpler manufacturing process and lack of internal structure can produce a shape sufficient to extract a significant amount of wind power while minimizing manufacturing and shipping costs.

The devices and methods described herein are scalable and can be used to produce vertical wind turbine blades of varying sizes. A sheet of material (e.g., a sheet with a length of about 30 cm-6000 cm) can be used to form a vertical wind turbine blade of a desired size. The size can be selected based on the application of the resulting wind turbine.

The present device, a vertically oriented blade shown generally as blade 100 in FIG. 1, can be utilized in wind turbines normally constructed of one or more thin planar metal such as steel or aluminum or composite materials such as fiber glass, carbon fiber, or plastic and the like. The hybrid blade includes a generally one or more sheets (e.g., square sheet, rectangular sheet) shaped into approximated curvilinear shaped blade. The sheet comprises a top edge, a bottom edge, an outer edge, and an inner edge (in relation to a central motor/generator). The sheet can have a thickness of about 0.5-15 mm. The thickness can be uniform along a length of the sheet or can vary. The blade comprises an outer surface 101 and an inner surface 102. The blade can include a slat also having approximate generally curvilinear shape with an outer surface and an inner surface. The blade and slat embodiments can be referred to as having approximated curvilinear shape because the shape is a series of segments with an angle between them that together form the overall curvilinear shape. It is the shaped thin material that forms the blade, having no internal structure.

The segments comprise bends in between them extending from a top edge to a bottom edge of the sheet. The bends are positioned along the sheet from the outer edge to the inner edge. In some embodiments, the segments can comprise curves or very closely spaced bends (e.g., < about 1 mm), extending from a top edge to a bottom edge of the sheet. The approximately curvilinear shape forms an outer surface and an inner surface of the sheet or blade. As shown in FIG. 1A, the outer surface of the blade towards the outer edge is the leading edge 120 of the blade as that is the portion of the blade that leads during motion of the blade. The inner edge of the blade forms the trailing edge 124 of the blade as that portion follows during motion of the blade. Between the leading edge 120 and the trailing edge 124 is the midsection 122 of the blade.

The bends can be done less than 1 mm apart, effectively creating a curve surface. In some embodiments, the leading edge 120 comprises about 2-20 (e.g., 2-10, 5-15, 15-20, 20) bends. A distance between each bend can be less than about 5 mm. It will be appreciated that these values can depend on the desired size of the blade. In some embodiments, a distance between bends in the leading edge can be about $1/20$-$1/30$ of the width of the sheet of material used to form the blade. Larger blades may have longer bend segments. An angle between the bends can be about from 1 to 15 degrees. In some embodiments, it is about 1 to 15 degrees. In some embodiments, the leading edge comprises more bend segments than the midsection or the trailing edge of the blade. The leading edge may also comprise greater bend angles than the other sections of the blade. The leading edge may also comprise a shorter distance between bend segments than the other sections of the blade.

In some embodiments, the midsection 122 comprises about 4 bends. Other configurations are also possible (e.g., 1-3 bends). A distance between each bend can be less than about 1 inch (about 2.5 cm). In some embodiments, a distance between each bend in the midsection can be about $1/10$ of the width of the sheet of material used to form the blade. An angle between the bends can be less than about 10 degrees. In some embodiments, an angle between the bends is about 1 to 10 degrees. In some embodiments (e.g., FIG. 1A), the midsection comprises fewer bend segments and lower bend angles than the leading edge, but more bend segments and higher bend angles than the trailing edge. In some embodiments, (e.g., FIGS. 5 and 6), the midsection comprises fewer bend segments and lower bend angles than both the leading edge and the trailing edge.

In some embodiments, the trailing edge 124 comprises less than about 3 bends (e.g., 1-3 bends). A distance between each bend can be less than about 1 inch (about 2.5 cm). In some embodiments, a distance between each bend can be about $1/10$-$1/20$ of the width of the sheet forming the blade. An angle between the bends can be less than about 3 degrees. In some embodiments, an angle between the bends is about 1-10 degrees. In some embodiments, (e.g., FIG. 1A, the trailing edge comprises fewer bend segments and lower bend angles than the leading edge and the midsection. In some embodiments (e.g., FIGS. 5 and 6), the trailing edge comprises fewer bend segments and lower bend angles than the leading edge, but more bend segments and higher bend angles than the leading edge.

More than 6 such bend segments are shown in the embodiments of FIGS. 1, 2, 3, and 4. More or fewer bend segments may be used depending on the design parameters. For example, 3, 4, 5, 7, 8, 9, 10, 11, 12, or more bend segments are possible.

Each bend segment can have a length of between about 2-10 cm depending on de position and the size of the blade. The length can be no greater than about 10 cm. The bend segments of the blade can be about $1/30$-$1/10$ a width of the sheet of material used to form the blade. In some embodiments, each bend segments has the same or similar lengths. Each bend segment can have a different length. Some bend segments can have a same length while others have different lengths.

In some embodiment, an angle between each bend segment is less than about 20 degrees. In other embodiments, the angle is about 15-20 degrees. Other angles are also possible (e.g., about 5-10 degrees, about 10-15 degrees, about 20-25 degrees, less than 5 degrees, greater than 25 degrees). In some embodiments, the angles between each of bend segments is the same. In some embodiments, the angles between each of the bend segments, varies.

Each blade can have a length of about 30-6000 cm. In some embodiments, the length is about 1000 cm. Other lengths are also possible (e.g., 30 cm, 30-1000 cm, 1000 cm, 1000-3000 cm, 2000-4000 cm, 3000-6000 cm, etc.). In some embodiments, each blade has a length of about 30-6000 mm (e.g., about 30 mm, 30-1000 mm, 1000 mm, 1000-3000 mm, 2000-4000 mm, 3000-6000 mm).

Figures 1C, 1D:
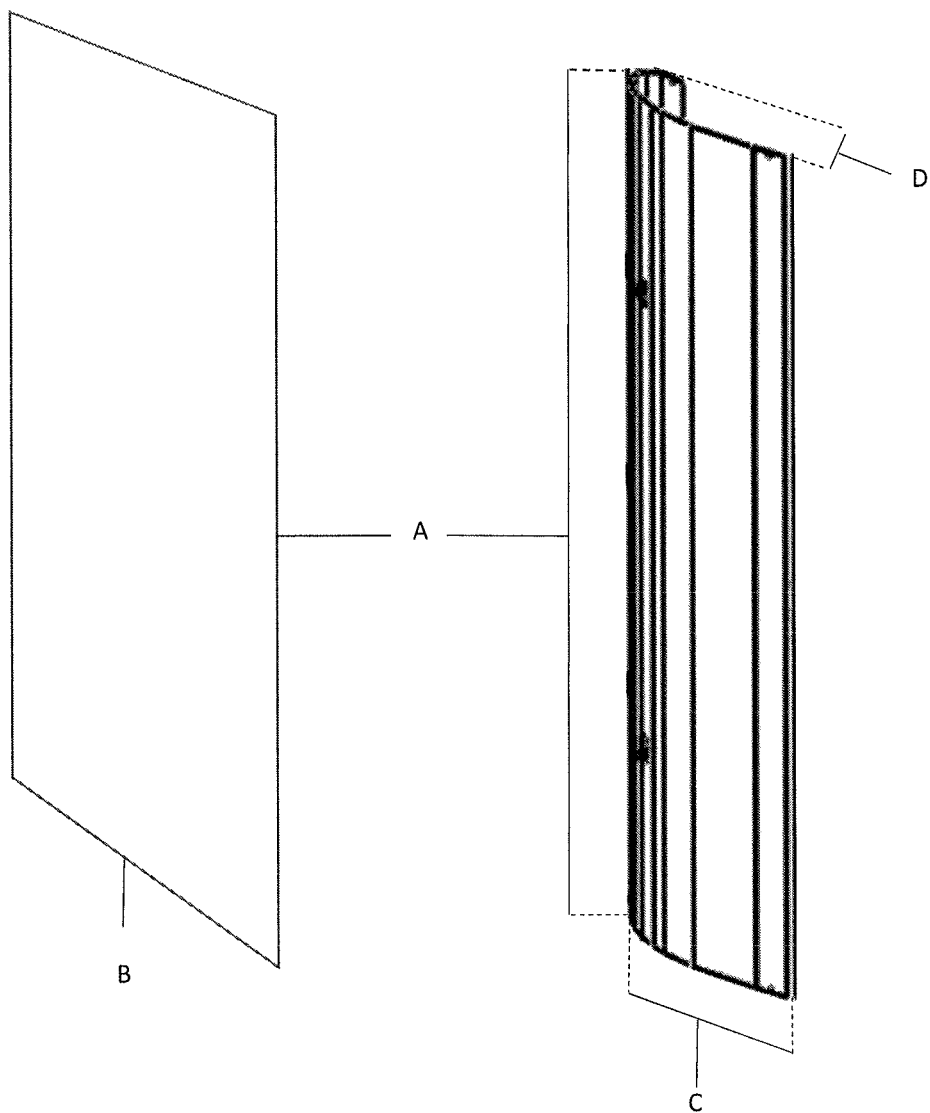
Figure 1E:
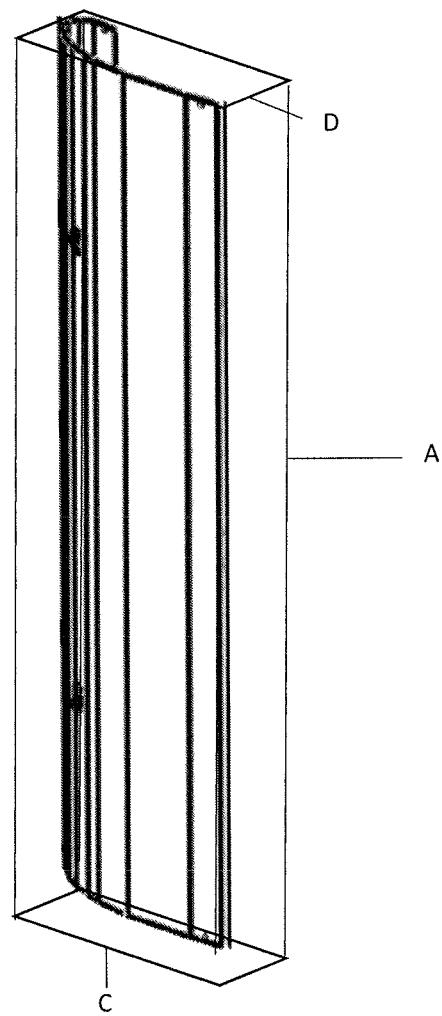

FIG. 1C illustrates a sheet of material used to form a vertical wind turbine blade as described herein. The sheet of material has a length A and a width B. As described above, the sheet of material is bent (or curved, pressed, rolled, etc.) a number of times to form a turbine blade. FIG. 1D shows an embodiment of a blade 140 formed from the sheet of FIG. 1C. The blade comprises a leading edge, a trailing edge, and a midsection or a foil shape between the leading and trailing edges. The blade 140 comprises a height A substantially equal to length A of the sheet. The blade has a width C that is about 50-90% of the width B of the sheet. The blade has a depth D that is about 5-30% of the width B of the sheet. The finished blade (with curvilinear foil shape) can fit into a container (e.g., flat packet container) having a volume of A×C×D. The small footprint and low weight (e.g., based on lack of internal structure) of the blade can enable easy shipping and handling of the blade. In some embodiments, the ease of packing the blades can allow the blades or resulting turbines to be sold to consumers in a retail environment (e.g., available for pickup from a store).

Figure 1F:
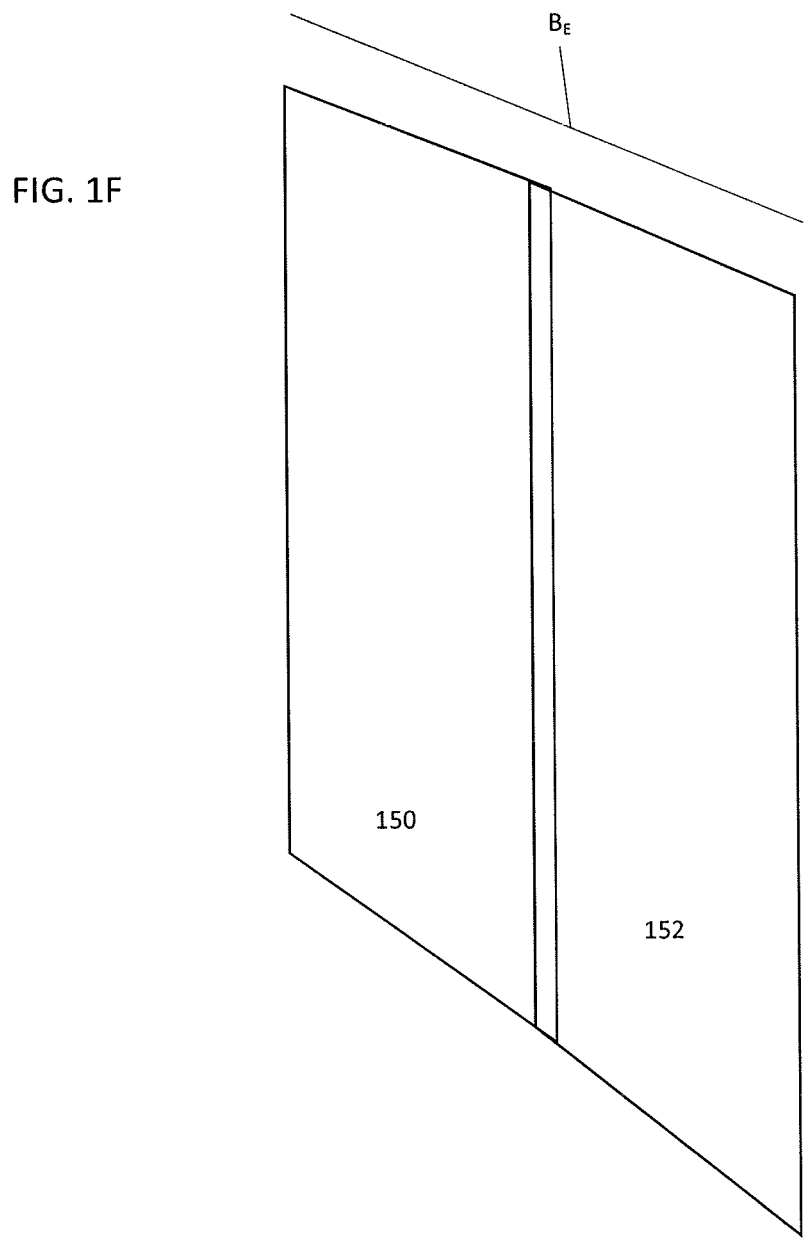
FIG. 1F shows an embodiment of two sheets of material used to form a wind turbine blade.

In some embodiments, more than one sheet is used to form the blade. In such embodiments, the finished blade dimensions will be based on a sum of the dimensions of the more than one sheet. For example, as shown in FIG. 1F, an effective width $B_E$ of sheets of material 150, 152 can be a sum of the widths of the more than one sheet of material used to form the blade. In some portion, an overlapping portion of the multiple sheets does not contribute to the effective width.

Figure 1G:
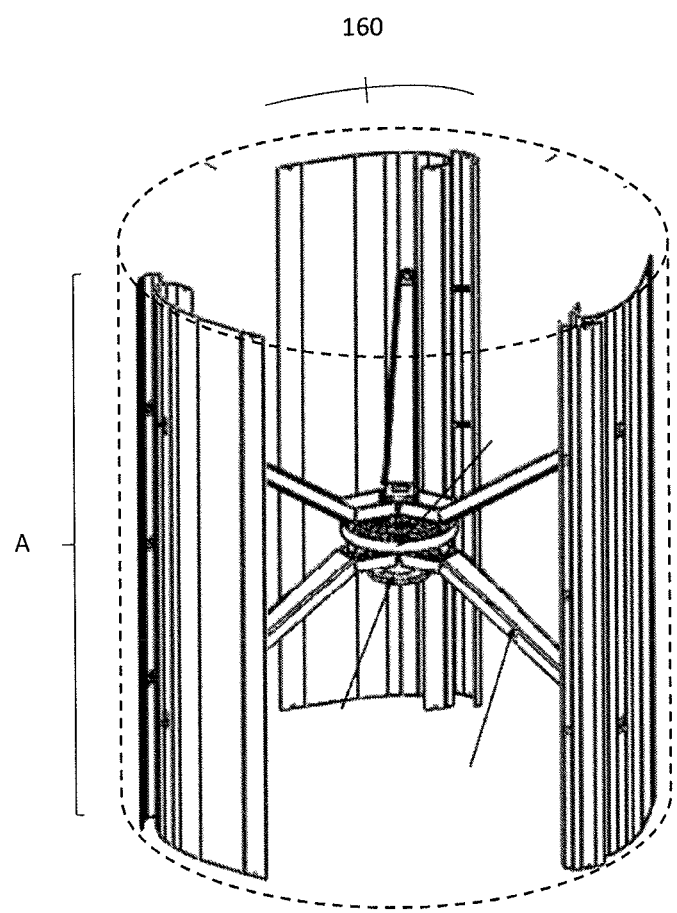
FIG. 1G depicts an embodiment of a wind turbine.

FIG. 1G shows an embodiment of a vertical axis wind turbine comprising three blade with the design of the blade of FIG. 1C. As shown in FIG. 1G, the wind turbine comprises a height A. The wine turbine can fit into a cylindrical envelope having a height A and a circumference at least about 3 times the length of the arc 160 of the blade.

Figure 2:
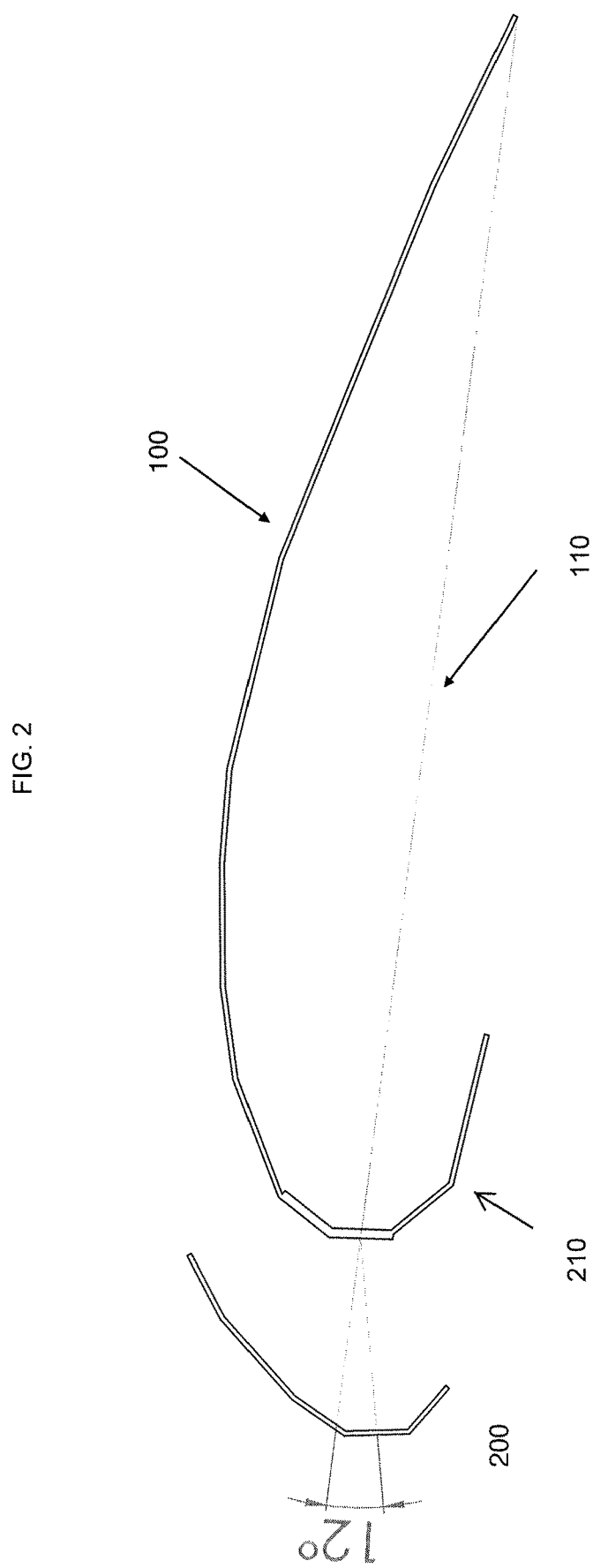
FIG. 2 illustrates an embodiment of a profile of a wind turbine blade and a slat.
Figure 3:
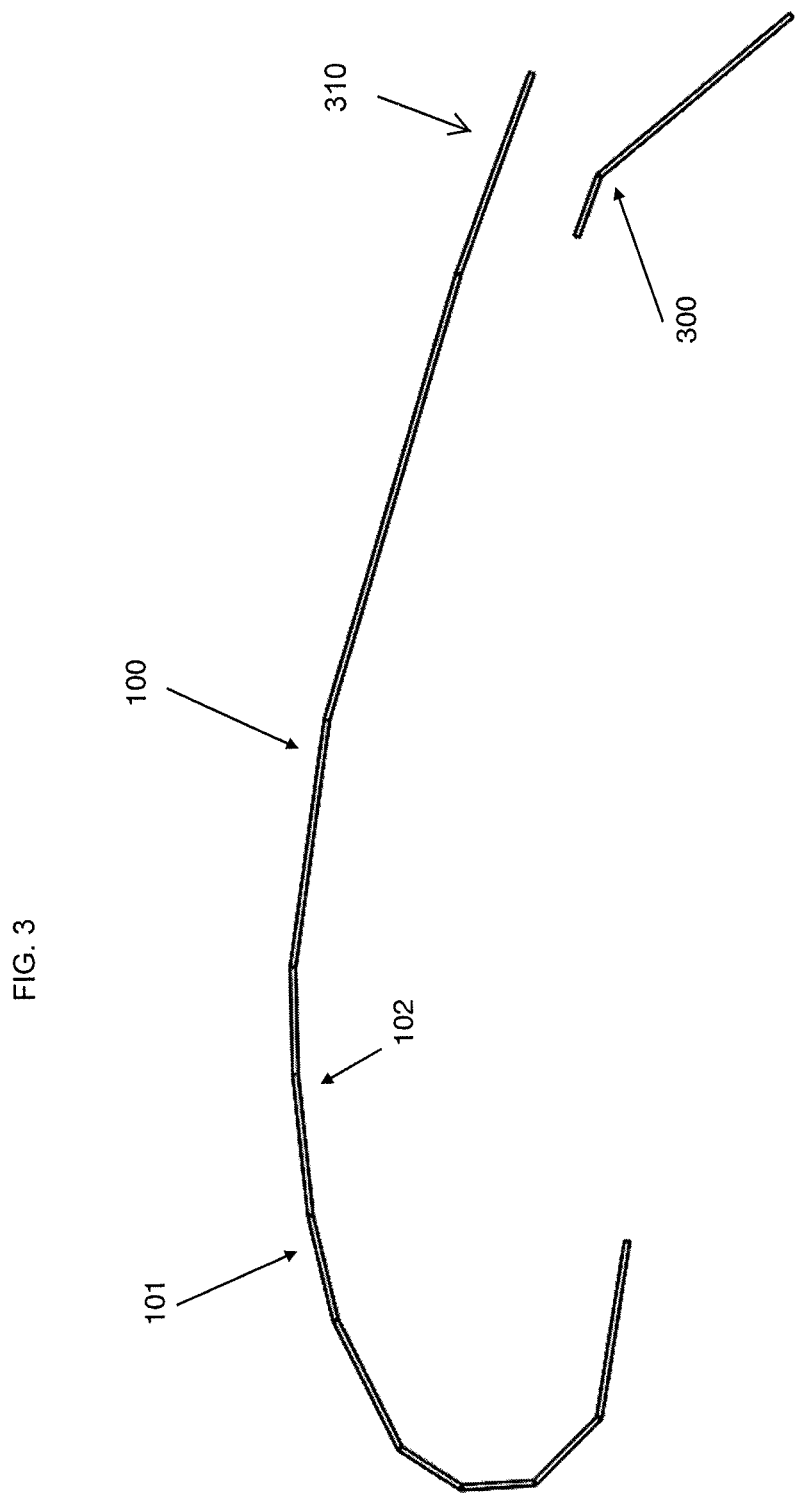
FIG. 3 shows an embodiment of a profile of a wind turbine blade and a flap.
Figure 4:
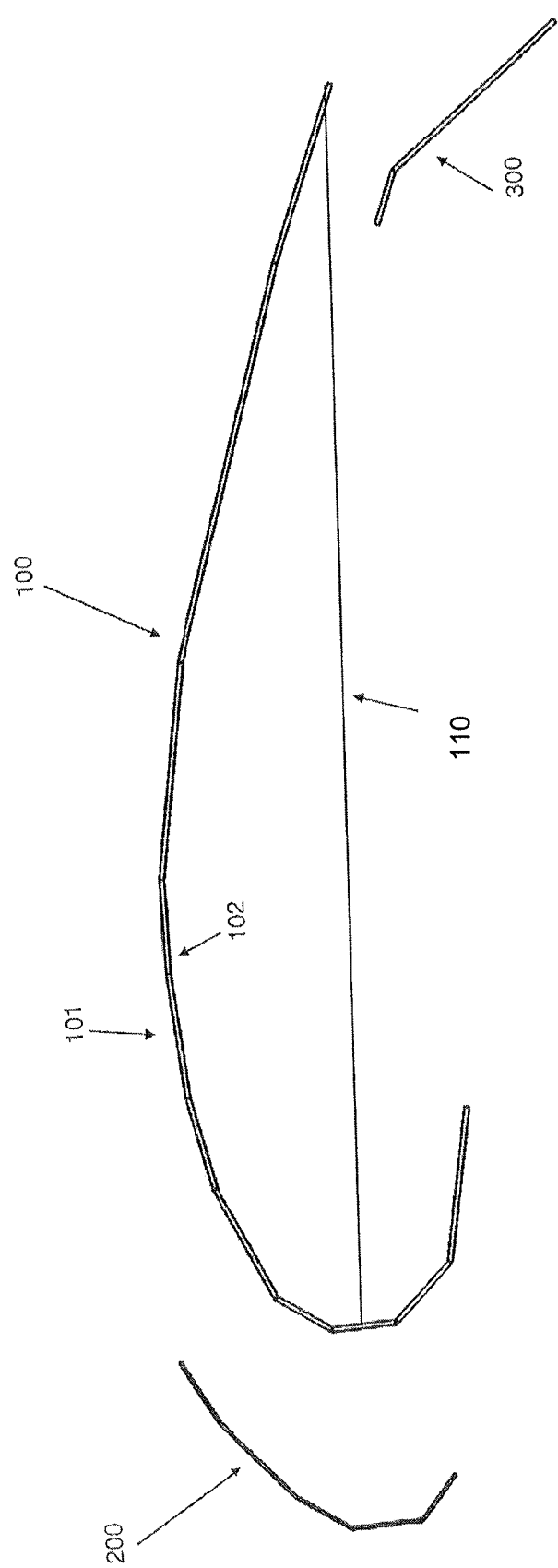
FIG. 4 depicts an embodiment of a profile of a wind turbine blade with a slat and a flap.

FIGS. 1A, 2, 3, and 4 illustrate profile views of different configurations of the blades 100. A blade may be augmented by the addition of a slat only (FIG. 2), a flap only (FIG. 3), or both a slat and a flap (FIG. 4). Blades are made from one or more metal sheet, and undergo a metal bending process, finishing with a surface similar to an airfoil with no internal structure. That semi-airfoil shape gives a thin profile that reduces manufacturing cost and its efficiency is less than 10% lower than a smooth regular airfoil. The hybrid array of the blade 100 allow the convex side of the blade 100 to work as a Savonius wind turbine (e.g., as shown in U.S. Pat. No. 1,766,765A) at low wind speeds, generating torque to move the system. The concave side of the shaped thin airfoil is designed to work as a conventional vertical axis Darrieus Type wind turbine. Slats 200 and flaps 300 are aerodynamic surfaces on the leading edge and the trailing edge of an airfoil which allow the airfoil to operate at a higher angle of attack, than would be allowed without the slats or flaps. A higher coefficient of lift is produced as a result of angle of attack and speed. By incorporating a slat in proximity to the blade leading edge, and the flap on the trailing edge, the hybrid vertical blade-slat-flap turbine embodiments described herein can generate more power at lower wind speed that a conventional blade only design (e.g., a blade without a slat or a flap). Similar advantages may be achieved using the blade-slat and blade-flap configurations described herein.

FIG. 2 shows an embodiment of a blade 100 and a slat 200. The slat 200 is positioned at a leading edge 210 of the blade 100. Similar to a blade 100, a slat 200 can comprise a number of bend segments. The slat 200 shown in FIG. 2 comprises five segments. Fewer or more bend segments are also possible (e.g., 3, 4, 6, 7, 8, 9, 10, or more). The slat 200 can be constructed from a sheet of the same materials as described above for the blades. In some embodiments, as shown in FIG. 2, the curve approximated by the slat 200 generally follows the curve of the blade 100. The slat 200 can be positioned at varying angles relative to the blade, as also described below. The embodiment shown in FIG. 2 comprises an angle of about 12 degrees relative to the chord 110 of the blade 100. The slat can be positioned at an angle of about 0-18 degrees relative to the leading edge of the blade.

FIG. 3 shows an embodiment of a blade 100 and a flap 300. The flap 300 is positioned at a trailing edge 310 of the blade 100. The flap comprises a number of bend segments. The embodiment of FIG. 3 comprises 2 bend segments. Fewer or more bend segments are also possible (e.g., 1, 3, 4, 5, or more). The flap can be attached to an inner or outer surface of the blade to position the flap proximate to the trailing edge of the blade. The trailing edge of the flap can be directed towards or away from the trailing edge of the blade. The trailing edge of the flap can be directed towards or away from the central vertical axis of the turbine. The flap can be positioned at an angle from 3 to 20 degrees relative to the chord 110 of the blade 100.

Figure 5:
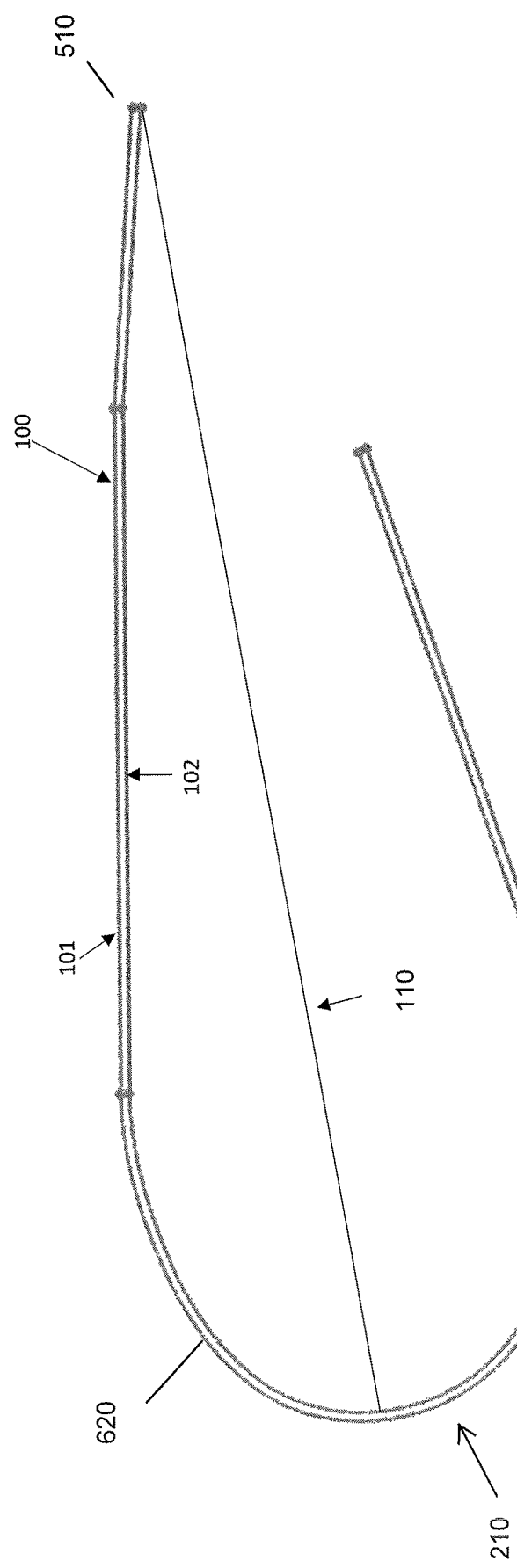
FIG. 5 illustrates another embodiment of a profile of a wind turbine blade.
Figure 6:
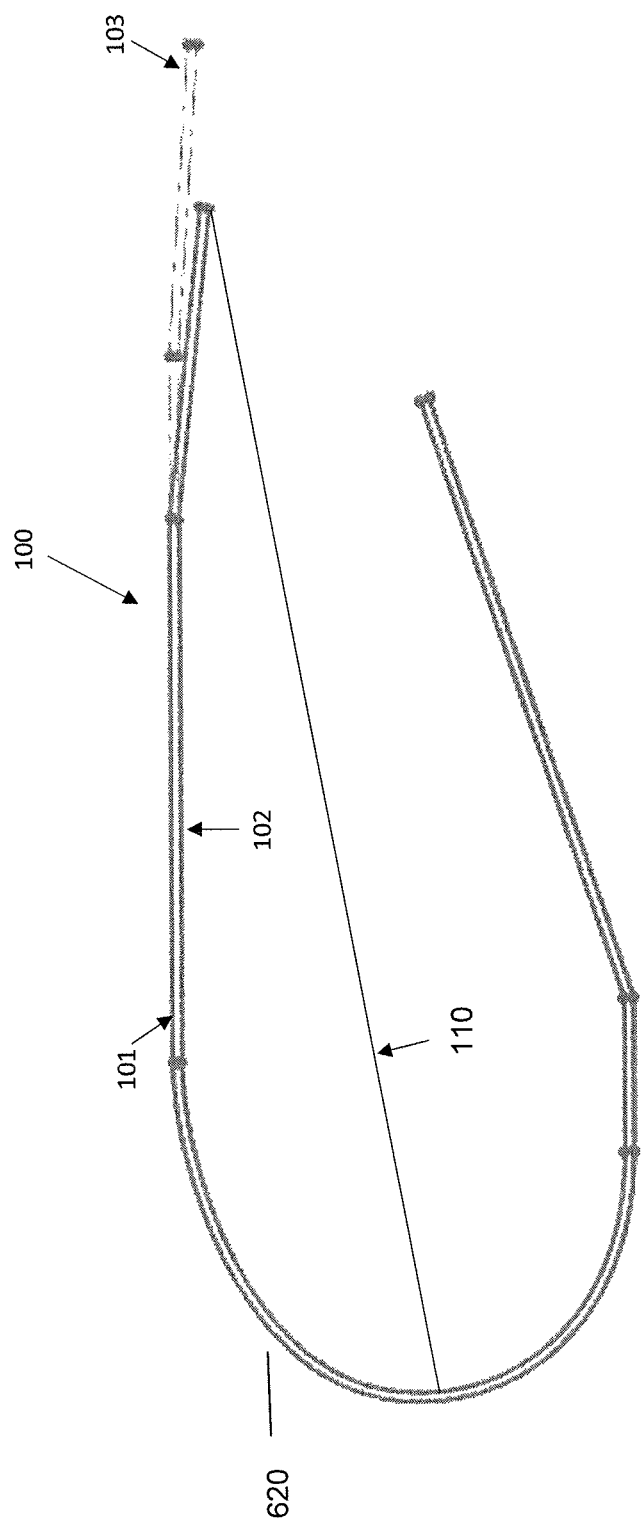
FIG. 6 shows another embodiment of a profile of a wind turbine blade.

In some embodiments, for example, as shown in the profile embodiments of FIGS. 5 and 6, the blade configuration does not conform to a standard airfoil design. In certain such embodiments, Computational Fluid Dynamics (CFD) can aid in the design. These blades 100 are designed to be use as in the other cases, with or without additional features like the slats 200 or the flaps 300. In these embodiments, the blade is bent such that the leading and trailing ends of the blade 100 are positioned within from 10 to 1000 mm of one another, depending on the scale of the blade. Such blades can comprise a central segment 620 curved in a non-symmetrical U-configuration. Such a curve can be formed, for example, using a die press in a bender machine. The inner side of the blade 102 works as a concave section to generate torque at low wind speeds, while the outer side 101 works as a conventional airfoil at higher wind speeds. In these blades, the angle of attack is about 10.5 degrees using the chord 110 from leading edge 210 to tail 510. Other angles of attack (e.g. from 7 to 15 degrees) are also possible. FIG. 6 also shows extension 103 in the trailing edge of the blade.

Figure 7A:
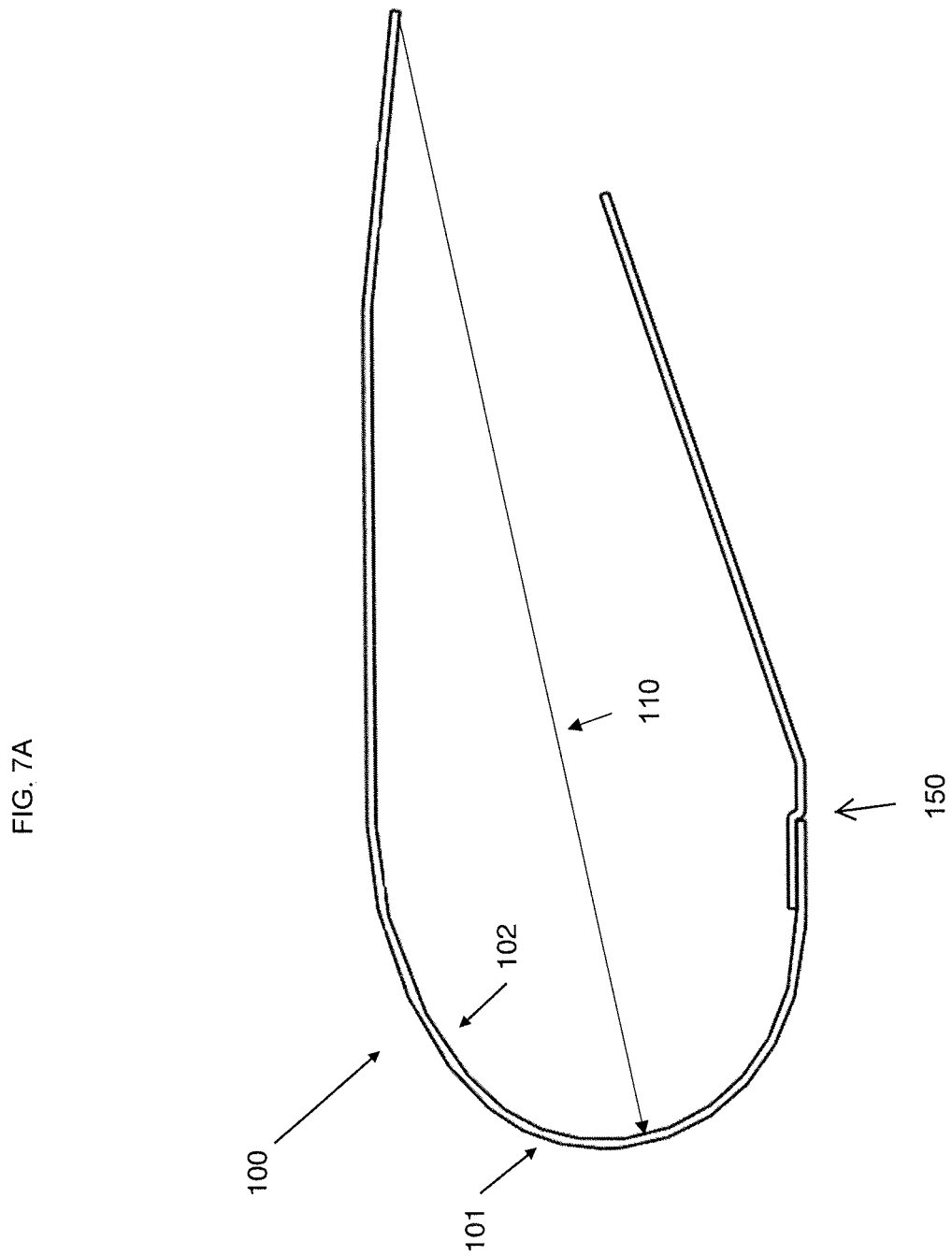
FIGS. 7A-7B depict an embodiment of a profile of a wind turbine blade comprising two sheets of material.
Figure 7B:
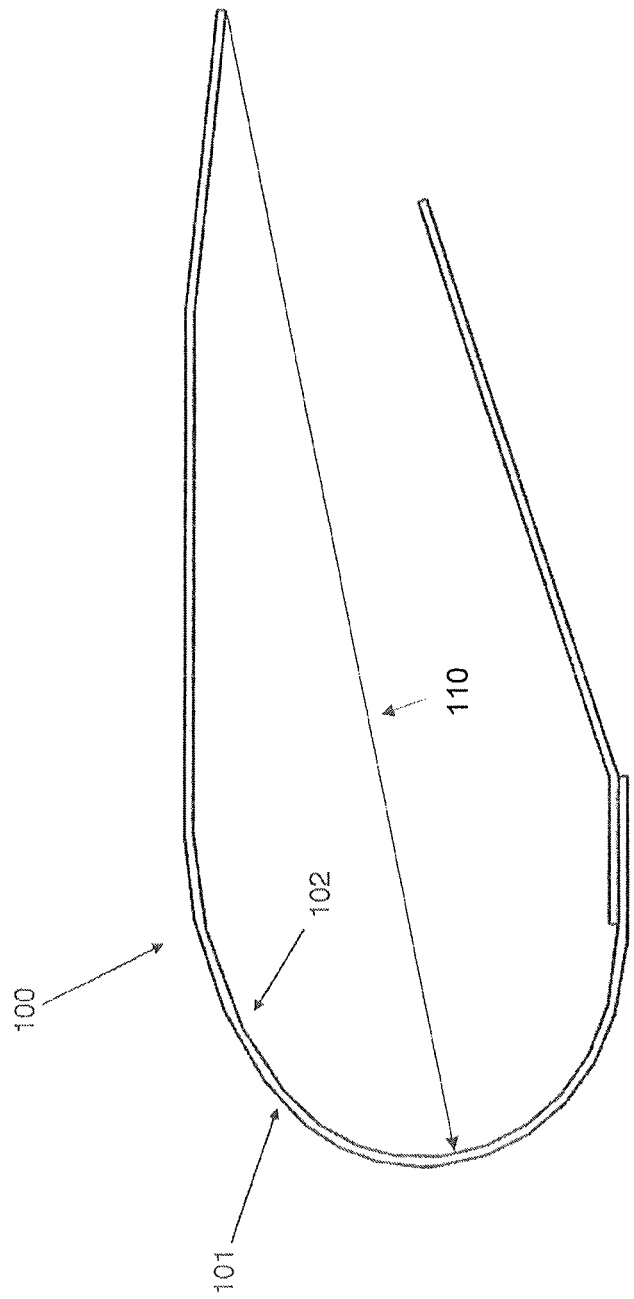

FIG. 7A shows the blade 100 from FIG. 6, using 2 sheets to complete the airfoil. This embodiment comprises the same bent sheet configuration, using, for example, welding or rivets (not shown) to connect the two sections. The step 150 provides an additional support to the connection and allows keeping the profile on the outer side 101. FIG. 7B also depicts the blade 100 from FIG. 6, but with no step on the connection between the 2 parts.

Figure 8:
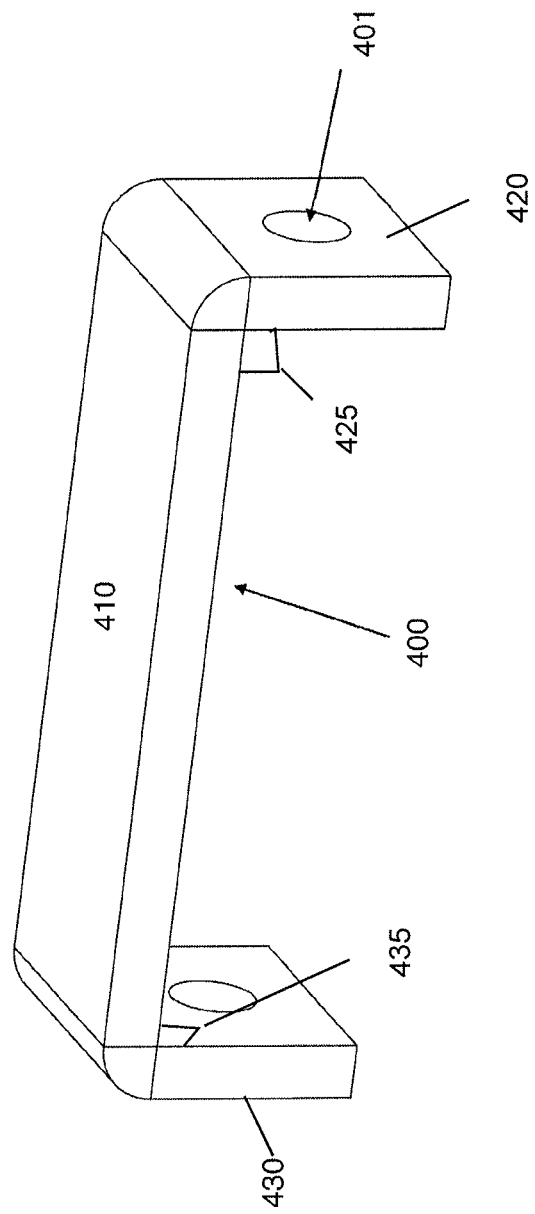
FIG. 8 illustrates an embodiment of a bridge used to fix a slat to a blade.

FIG. 8 shows an isometric view of an embodiment of a bridge 400 used to fix the slat 200 to the blade 100. The bridge 400 has a span 410 adapted to engage the slat with the slat side mount 430 and the blade with the blade side mount 420. The bridge 400 is also made by a bending process, making it easy and inexpensive to manufacture. The bridge can comprise the same materials as those described above with respect to the blade. The bridge can comprise a length of about 3 cm to 40 cm. FIG. 8 also illustrates an embodiment, in which the slat side mount-span angle 425 and the blade side mount-span angle 435 are each 90 degrees. Other configurations are also possible. For example, the slat side mount-span angle 425 can be between about 60 to 90 degrees. The blade side mount-span angle 435 can be about 60 to 90 degrees. Different span angles may be used depending upon the specific design characteristics of the span and the blade as well as the desired final orientation between the span and the blade. For example, FIGS. 2 and 4 present variations in the slat-blade orientation angle. The angle of the slat 200 can vary based on the desired orientation based on a number of design factors. For example, the slat-blade angle can selected from an angle of 0 degrees as in FIG. 4 to up to 12 degrees as in FIG. 2. The angle of the slat is measured with respect to the blade 100 chord, to modify the lift/drag ratio according to the wind speed to optimize power output. Apertures 401 can be used to mount the bridge 400 to the blade and the slat, for example via rivets, bolts, or the like.

Figure 9:
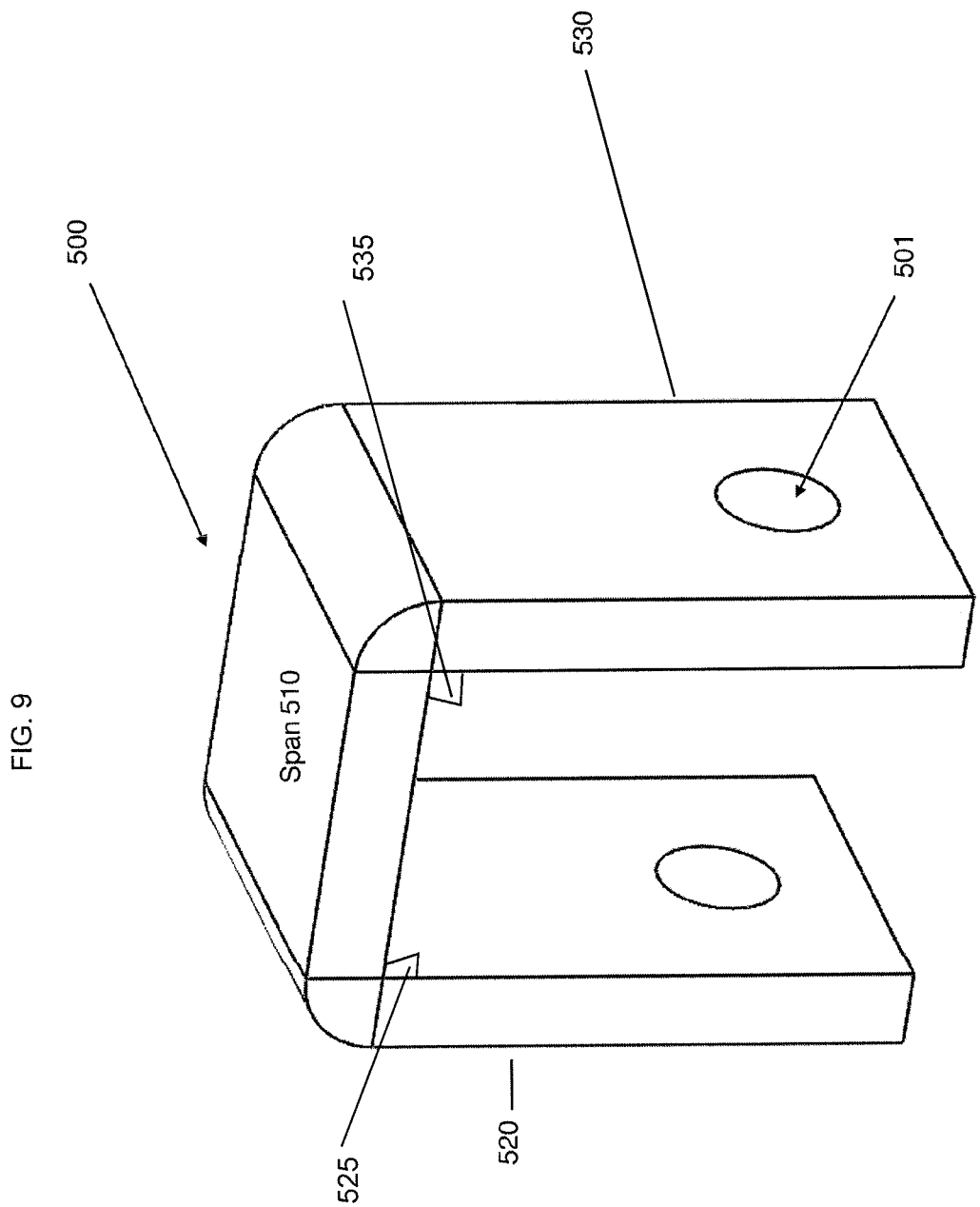
FIG. 9 shows an embodiment of a bridge used to fix a flap to a blade.

FIG. 9 is a detailed view of an embodiment of a flap mounting bridge 500, comprising a blade side mount 520 and a flap side mount 530. The bridge 500 comprises a span 510 adapted to engage a flap with the flap side mount 530 and the blade with the blade side mount 520. Bridge 500 also comprises a side mount span angle (blade to span 525, span to flap 535) of about 90 degrees. Other angles are also possible. For example, the flap side mount-span angle 535 can be about 75 to 90 degrees. The blade side mount-span angle 525 can be about 90 degrees. This part is also manufactured using sheet bending process and can comprise the same materials as described above with respect to the blade. The bridge span 510 can comprise a length of about 2 to 10 cm. The flap side mount 530 can comprise a length of about 2 to 20 cm. The blade side mount 520 can comprise a length of about 2 to 30 cm.

Figure 11:
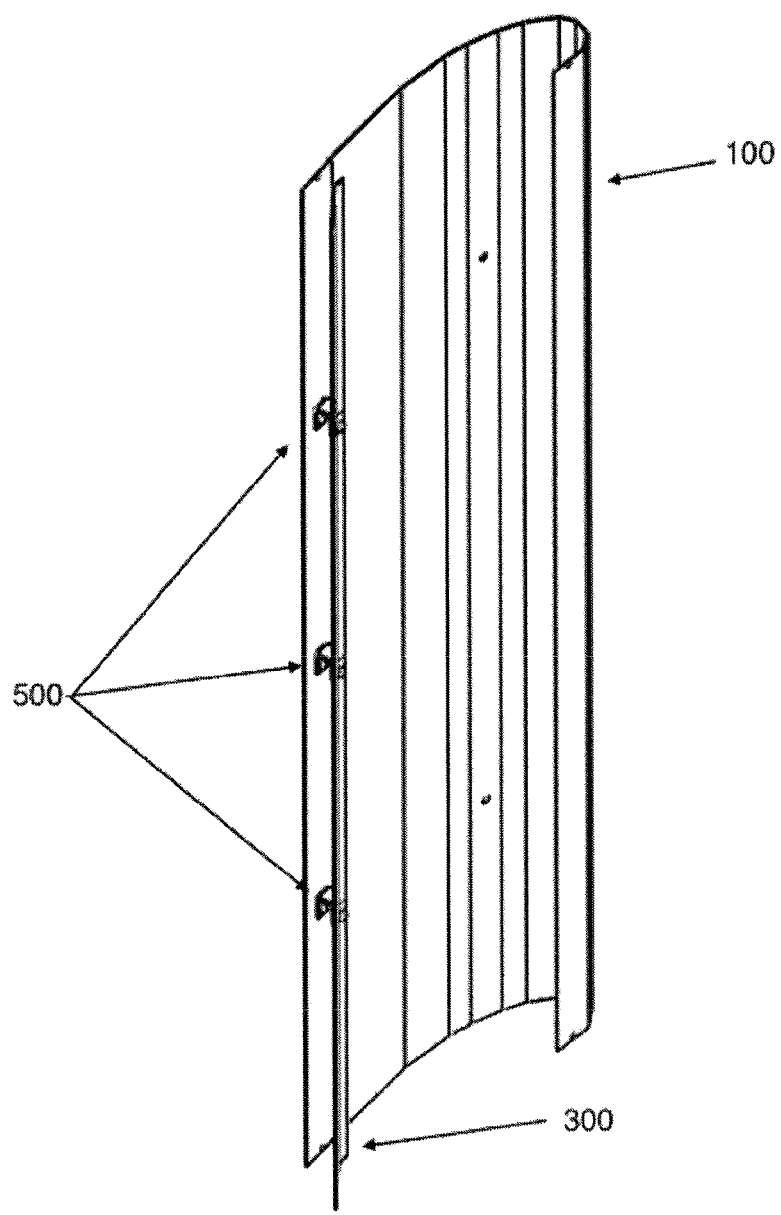
FIG. 11 illustrates an embodiment of a blade fixed to a flap using bridges.

An exemplary flap mount 500 is shown in use in FIG. 11 connecting blade 100 to flap 300. As described above, the flap mount 500 may have various geometries and dimensions to adopt blade-flap configurations similar to bridge 400 to adopt blade-slat configurations. FIG. 11 shows 3 bridges 500 being used to connect the blade 100 to the flap 300. Fewer or more bridges can also be used. For example, 2, 4, 5, 6, 7, or more bridges may be used.

Figure 10A:
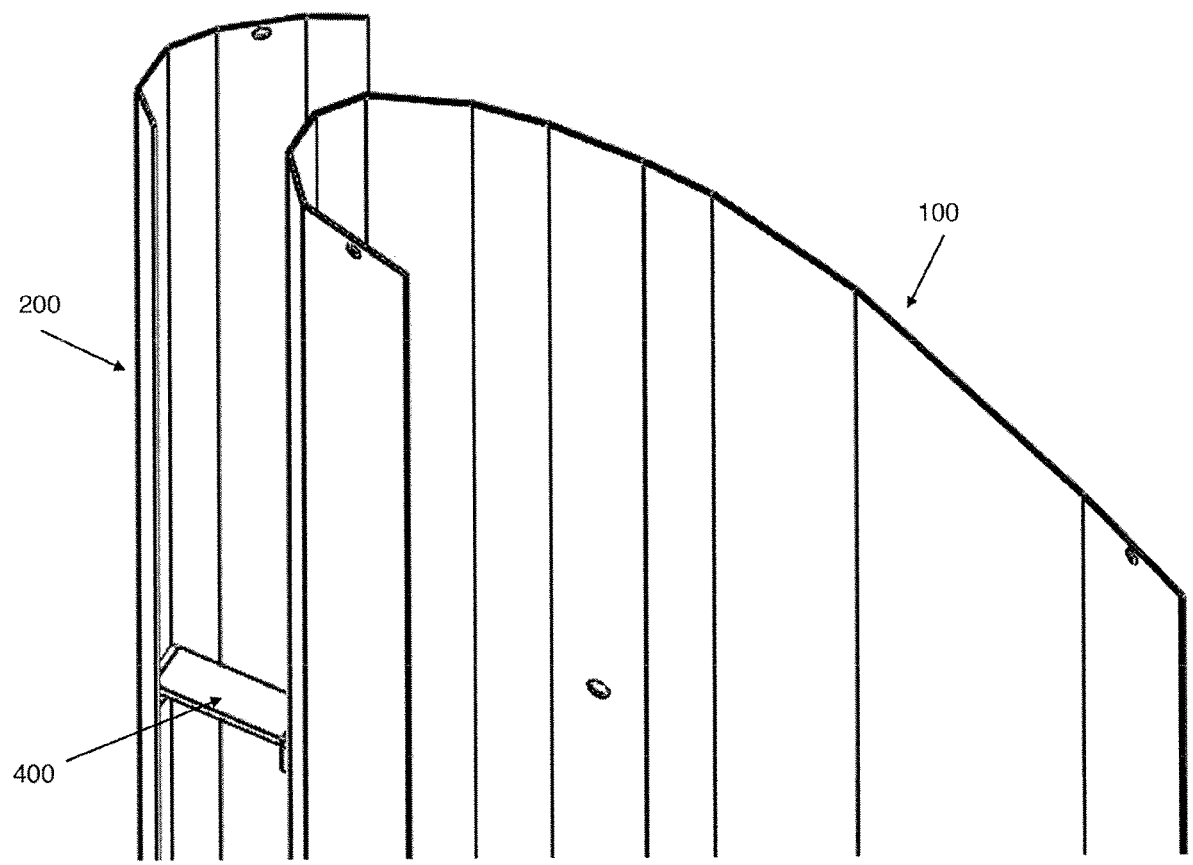
FIGS. 10A-10B depict an embodiment of a blade fixed to a slat using one or more bridges.
Figure 10B:
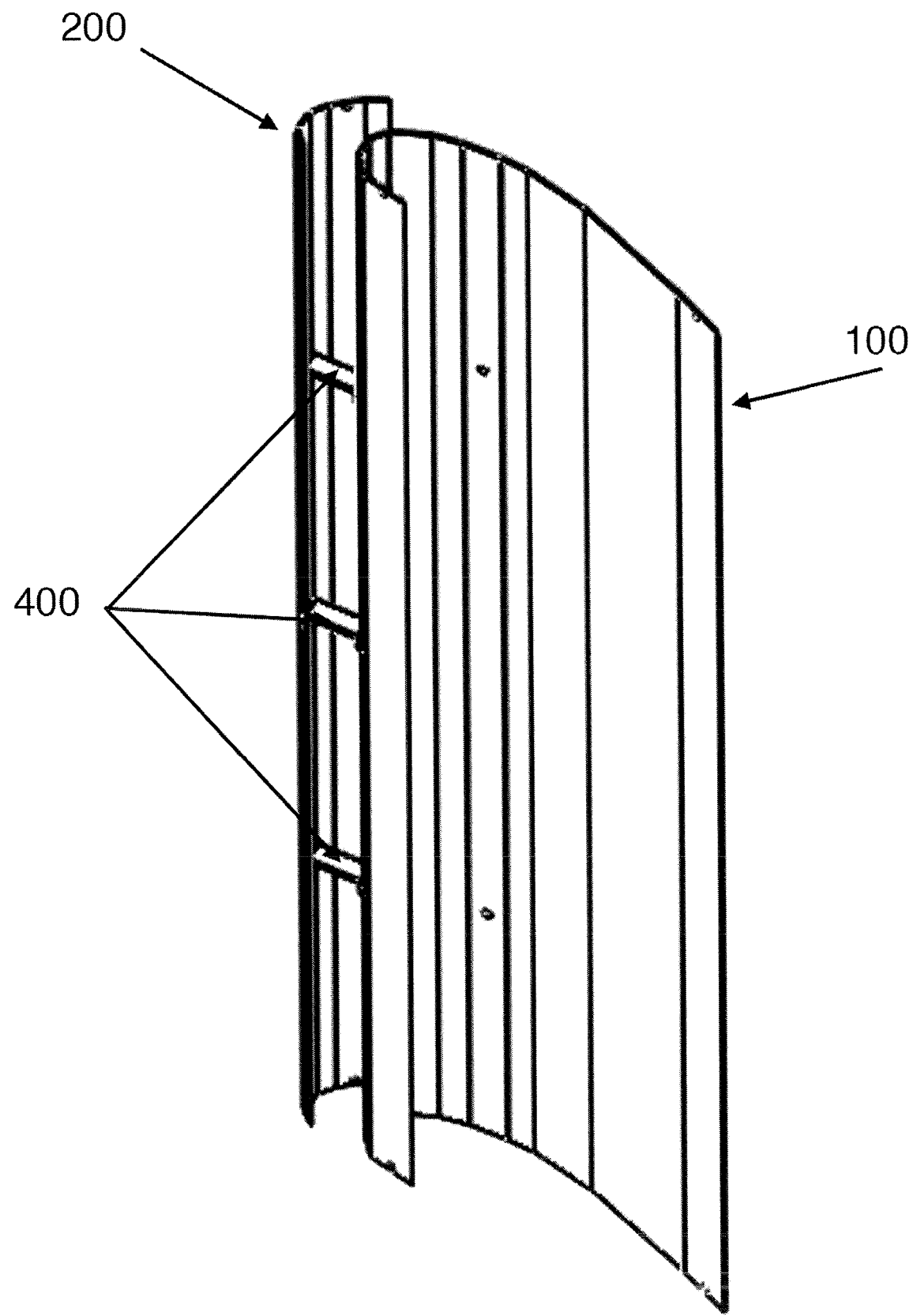

FIGS. 10A and 10B show an embodiment of a blade slat combination using 3 bridges 400 to connect the blade 100 to the slat 200. The bridges 400 can be fixed to the slats and blades using rivets or bolts. Fewer or more bridges can be used to connect a blade to a slat. For example, 2, 4, 5, 6, 7, or more bridges may be used. FIG. 10A shows a detailed view of the bridge connecting the slat and the blade.

Figure 12:
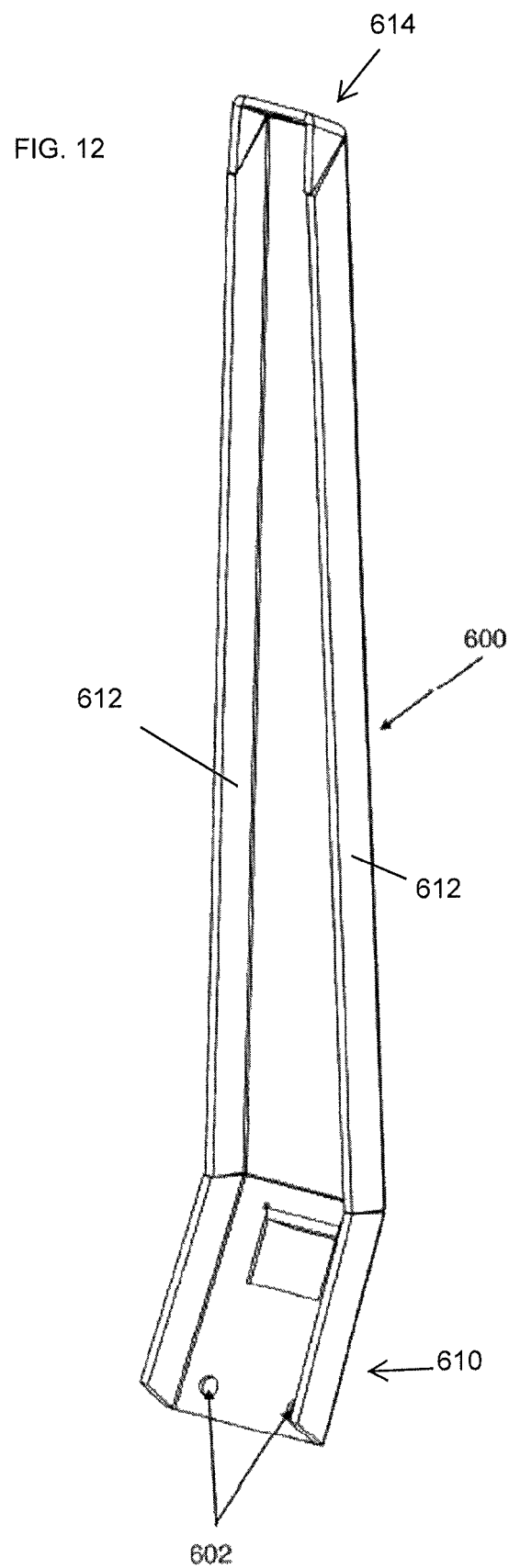
FIGS. 12-14 show various views of an embodiment of a turbine arm.
Figure 13:
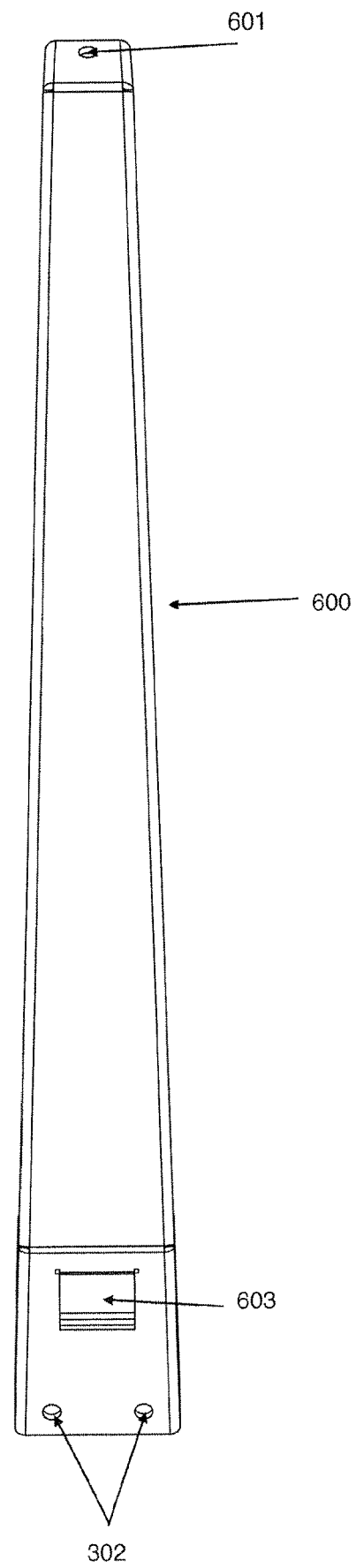
Figure 14:
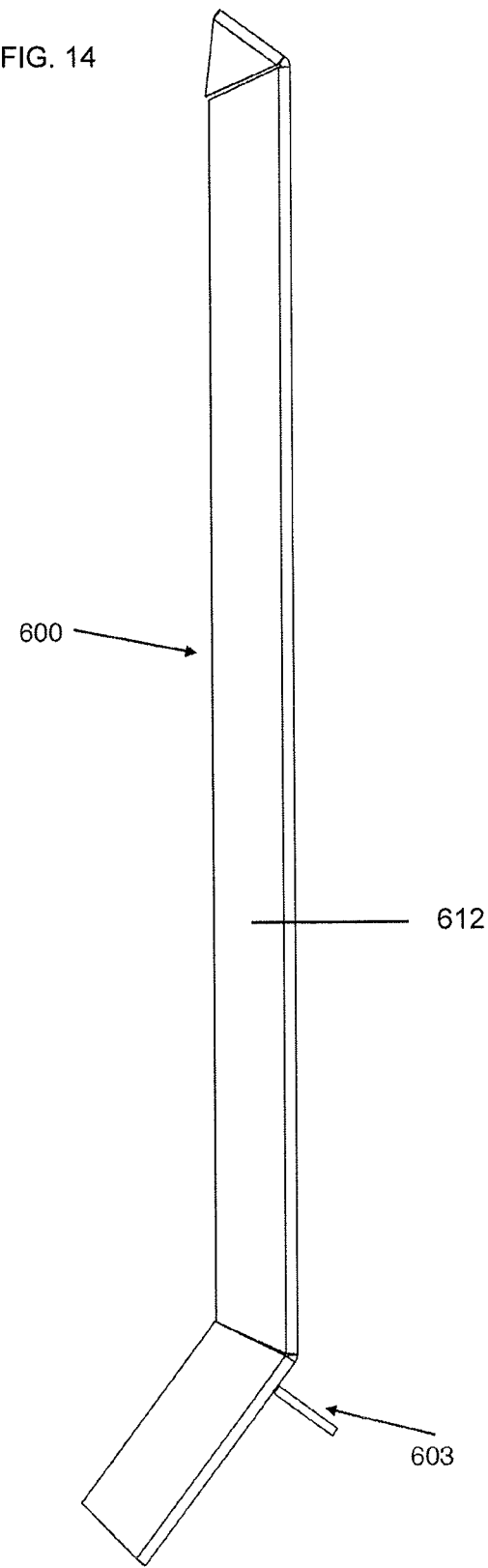

FIGS. 12-14 show different views of an embodiment of a turbine arm 600. FIG. 12 shows a perspective view of an inner side of the arm 600. Apertures 601 can be used to connect a base portion 610 of the arm 600 to a generator. Base portion 610 can be configured to rest against a generator to aid in stability of the connection. Outer portion 614 can be configured to rest against a blade to aid in stability of the connection. The arm can be manufactured using the same bending process as described previously for the blades, making it easy to manufacture. Walls 612 are designed to support weight and provide structural stability to the system. FIG. 13 shows a top view of an outer side of the arm 600. A stand 603 is bent from the arm 600 and is configured to help support the blade, and provide a solid base. Aperture(s) 601 can be used to connect the arm 600 to a blade. FIG. 14 is a side view of arm 600, showing wall 612. The arm 600 can have a length from about 30 to 150 cm and have a width of about 30 to 50 cm with angles from about 20 to 45 degrees, depending on the scale and the size of the turbine. More or fewer apertures can be used to secure the arm to the generator or the blade.

Figure 15:
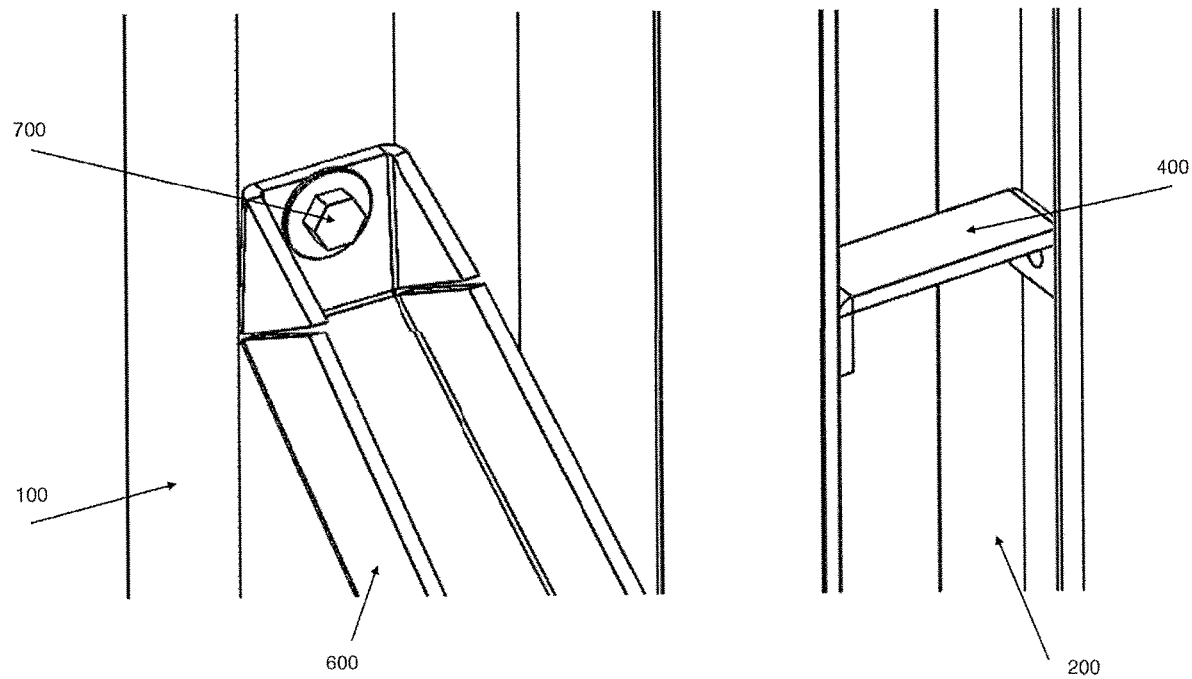
FIG. 15 depicts an embodiment of a connection between a blade and a turbine arm.

FIG. 15 is a detailed view of an embodiment of a connection of a blade 100 and an arm 600 through the hole 601 (not shown) in the arm 600 and holes in the blade 100 using a bolt and self locking nut 700. Other fixing mechanisms (e.g., rivets) are also possible. Also visible in this section view of the blade is a close up view of a bridge 400 between a blade 100 and a slat 200.

Figure 16:
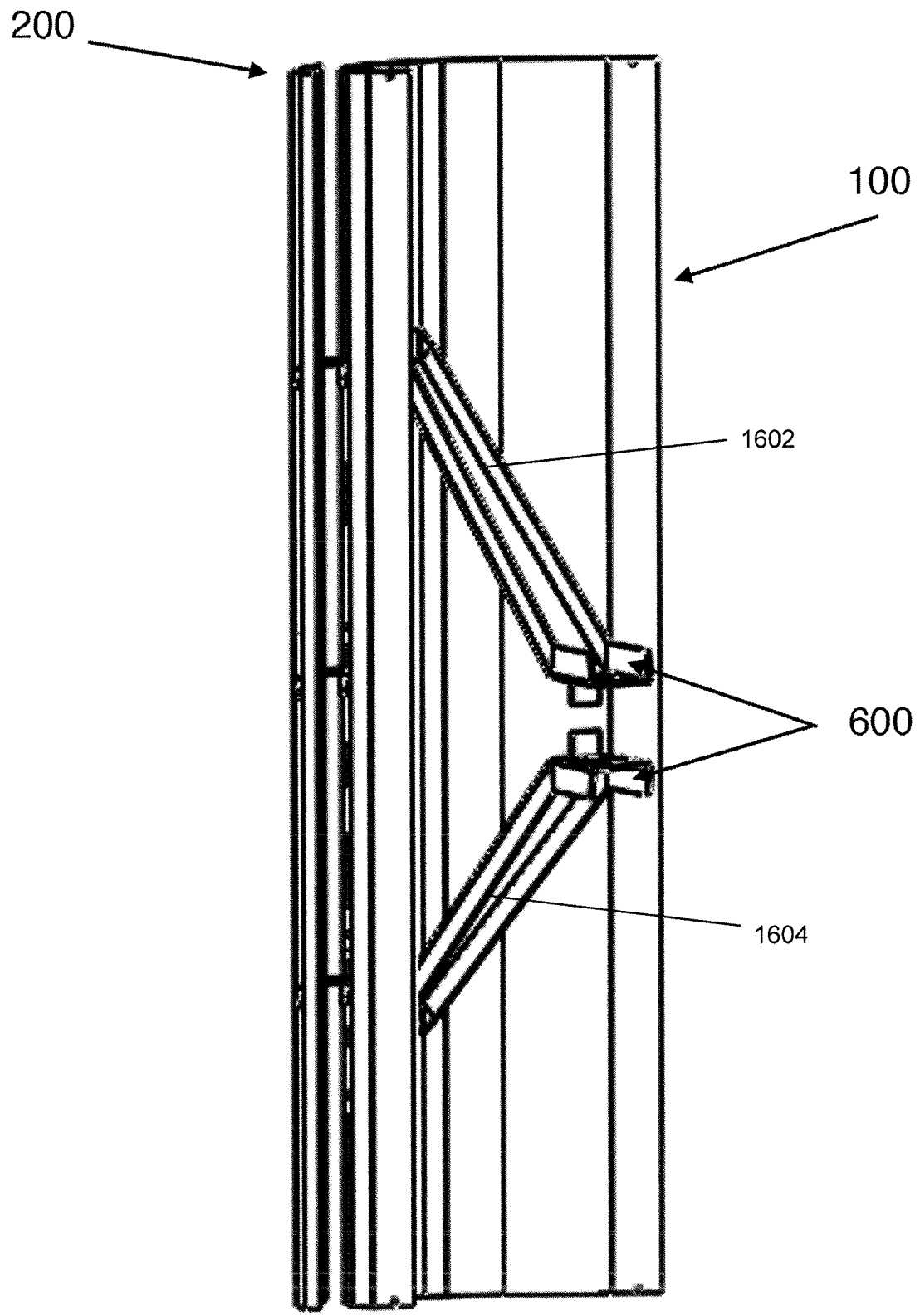
FIG. 16 illustrates an embodiment of turbine arms mounted to a blade.

FIG. 16 is a perspective view of an embodiment of a mirror configuration of the arms 300 mounted on a blade 100 in position for coupling to a generator. The arms 300 are positioned so that they extend outward from base portions 610 toward an upper fixation point and lower fixation point on the blade 100. Outer side of the arms 300 are facing each other, while the inner side (side with walls 612) of the upper arm 1602 faces up and the inner side of the lower arm 1604 faces down.

Figure 17:
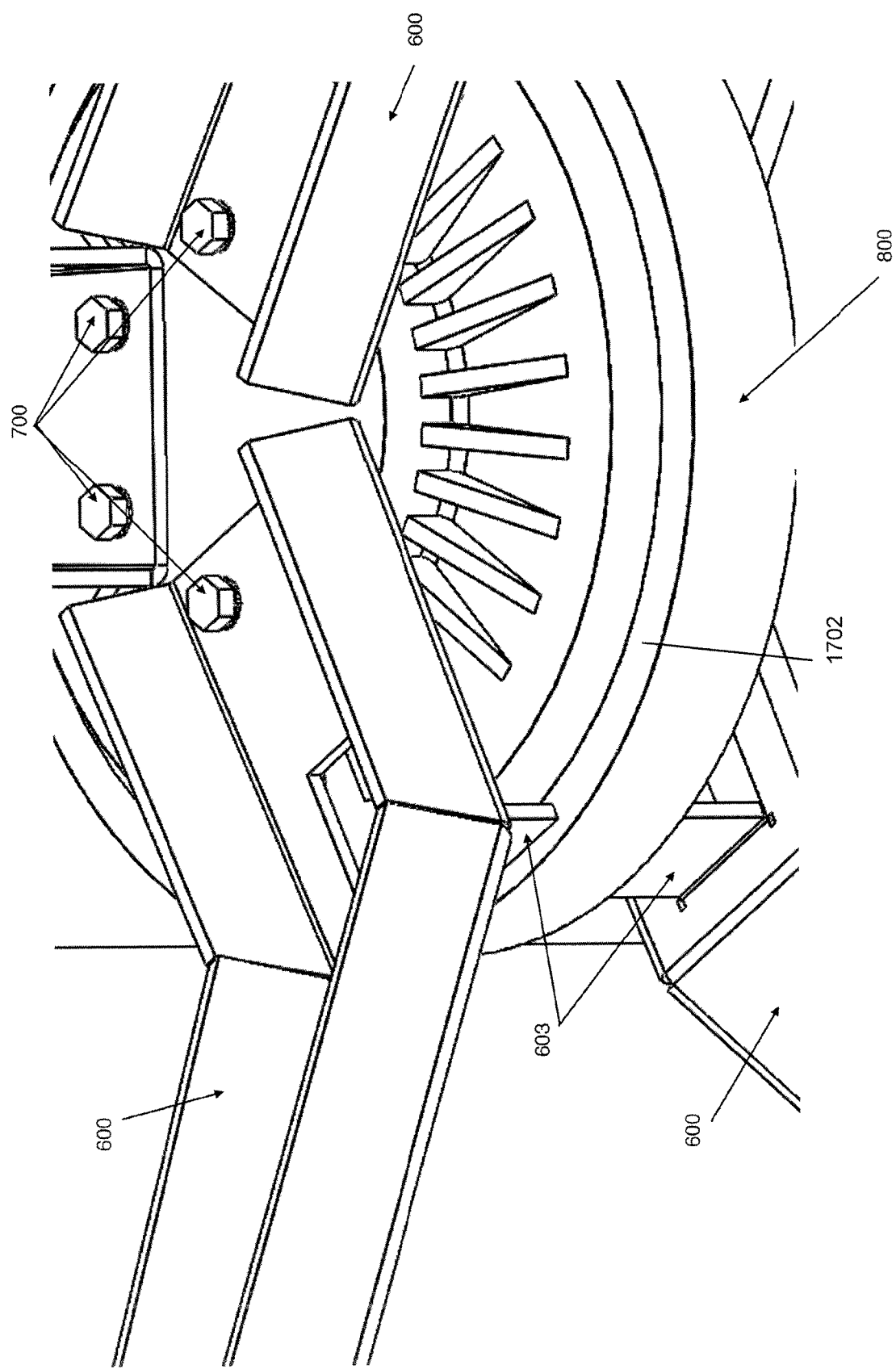
FIG. 17 shows an embodiment of a connection between a turbine arm and a generator.

FIG. 17 shows a detailed view of an embodiment of an arm 600 mounted to a generator 800 using the arm holes 602 (not shown) and bolts 700. The stand 603 is configured to fit on the step 1702 over the generator 800. Any kind of excited or non-excited generator or alternator can be used with the system, due to their high starting torque and the possibility of reaching high RPMs. An exemplary generator is a Permanent Magnet Alternator, axial flux, and coreless. Another exemplary generator is illustrated and described in U.S. Patent Application Publication US20130049512 A1.

Figure 18:
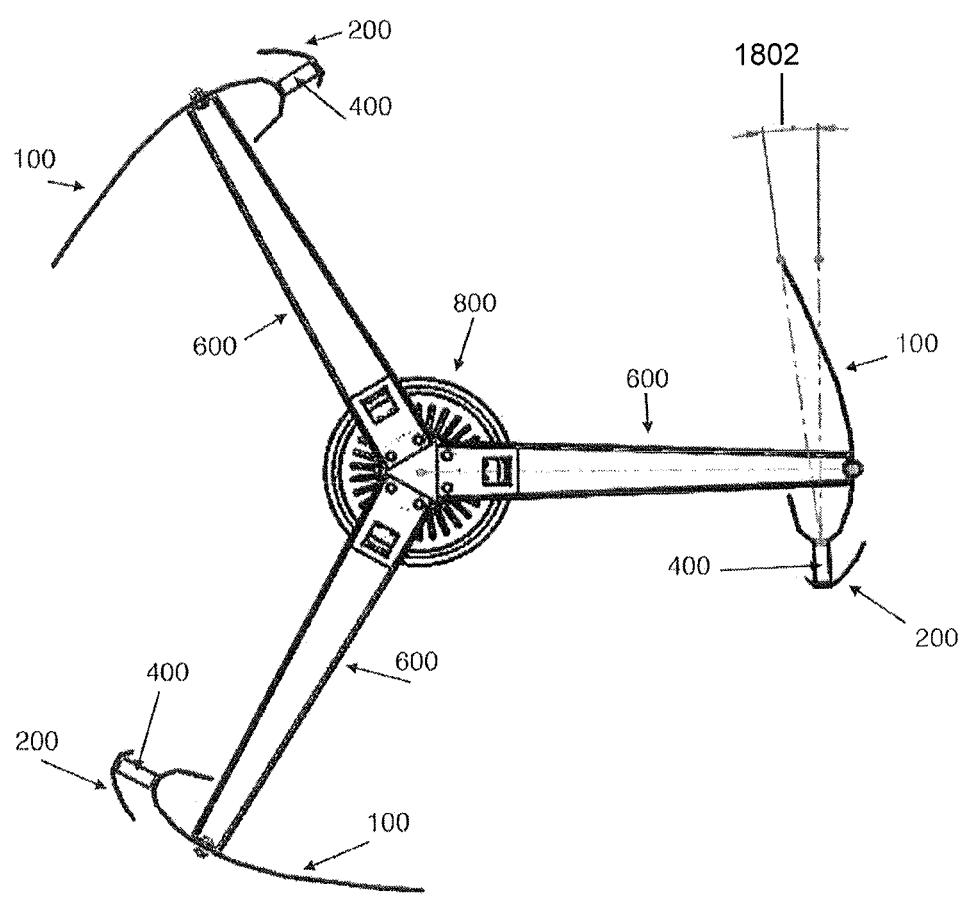
FIG. 18 depicts a top down view of an embodiment of a turbine.
Figure 19:
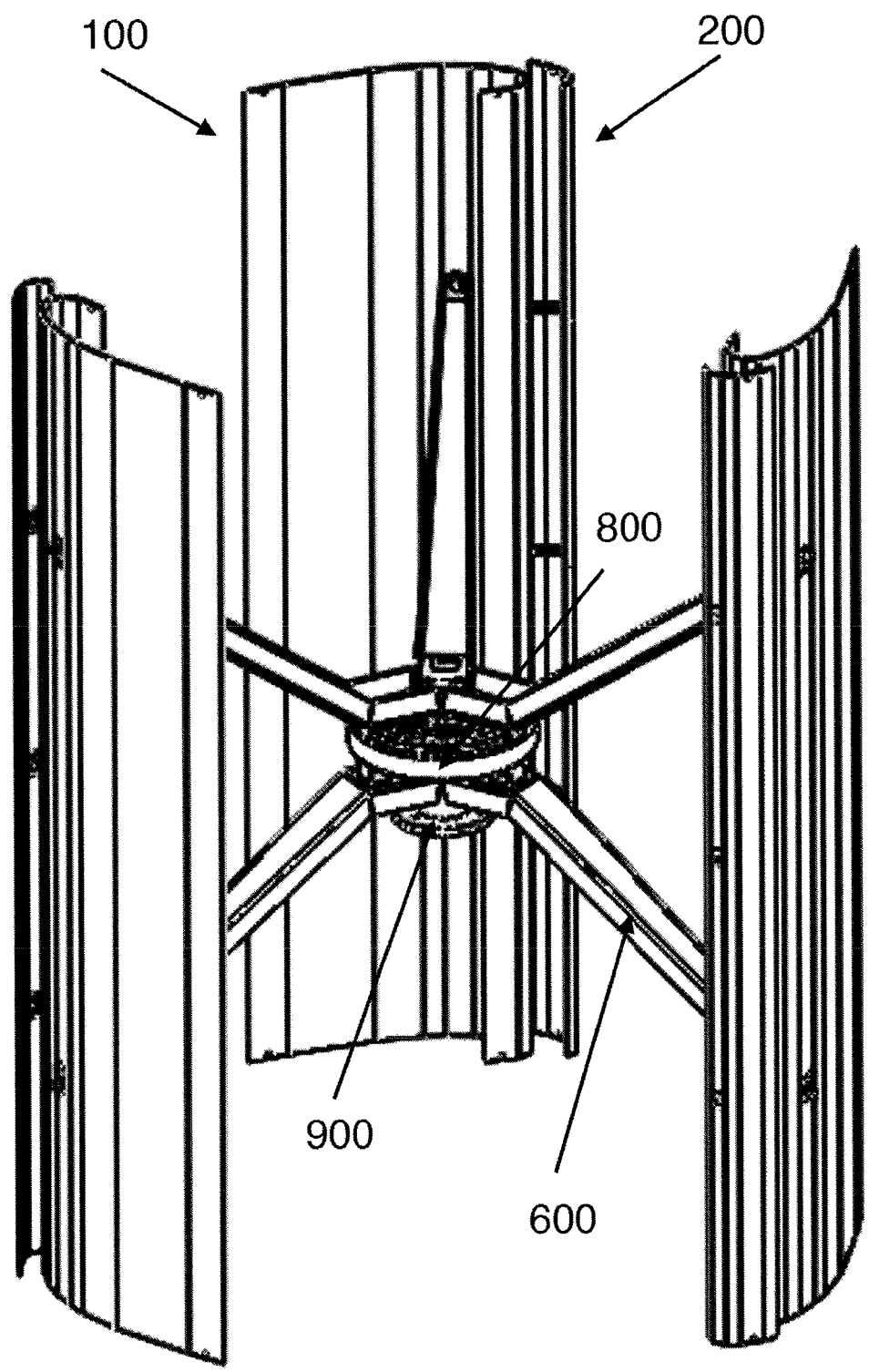
FIG. 19 illustrates a perspective view of an embodiment of a turbine.

FIG. 18 shows a top down view of an embodiment of a turbine, having a 3 blade 100 configuration, with one slat 200 in each blade 100 with mounting arms 600 extending from an axial flux alternator 800 in the middle. The arms 600 can be transversely oriented with respect to the central alternator or generator. The arms 600 can be mounted to a rotor shaft of the generator or alternator. The configuration illustrates the blades 100 distributed evenly in a concentric array around the alternator 800. This view also shows the attack angle 1802 of the blade group measured from the center of the arm 600 and the blade 100 chord. In some embodiments, the attack angle 1802 is about 7.5 degrees. Other angles are also possible (e.g., about 5-12 degrees, about 6-10 degrees, about 6-8 degrees, etc.). FIG. 19 is a perspective view of an embodiment of a turbine system, showing a base 900 of the turbine. FIG. 19 shows the mirror configuration of the arms 600 (e.g., as shown in FIG. 16) extending from an alternator 800 and the way in which the arms are connected to the blades 100 (e.g., in a manner similar to that shown in FIGS. 15 and 16).

Figure 20A:
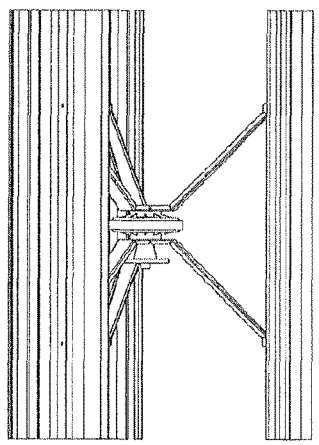
FIGS. 20A-20C show side views of an embodiment of a turbine.
Figure 20B:
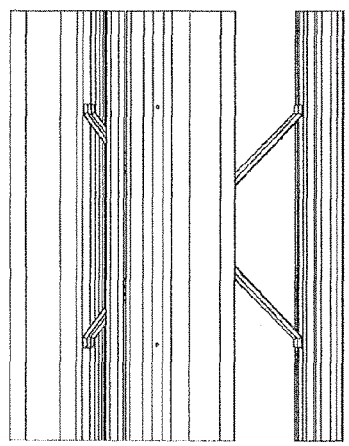
Figure 20C:
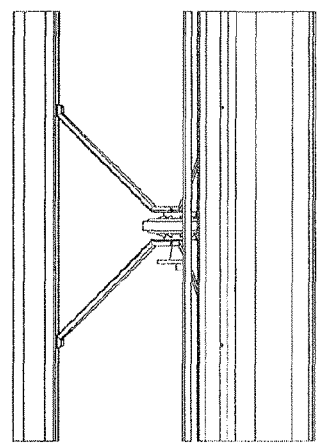

FIGS. 20A-20C show side views of the turbines of FIGS. 18 and 19 with the blades in different positions of rotation, allowing various views of the turbine.

Figure 21:
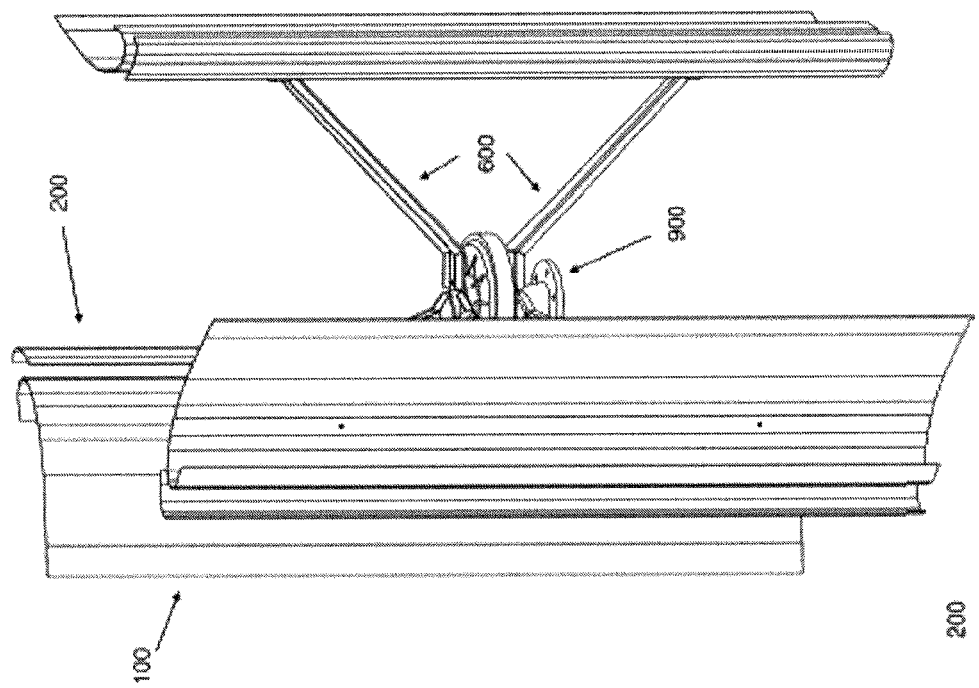
FIGS. 21A-21B illustrate views of an embodiment of a turbine.
Figure 21A:
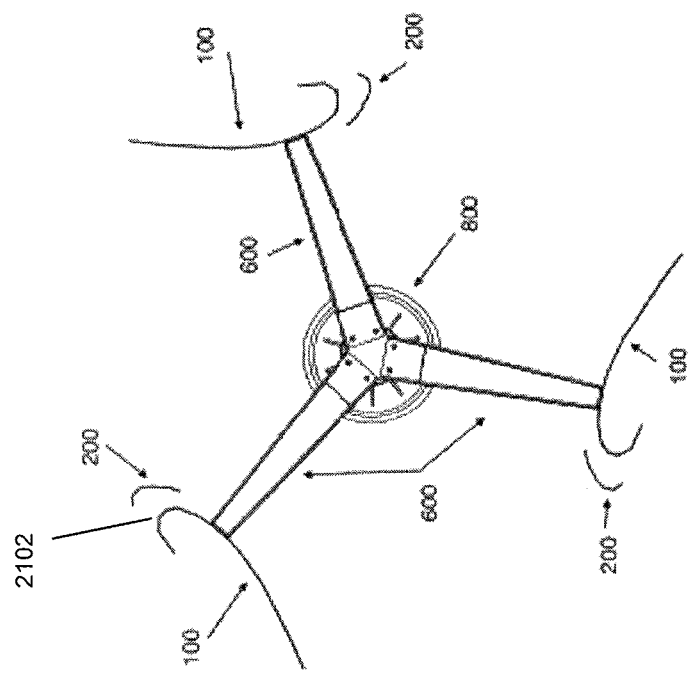

FIGS. 21A and 21B are top down and perspective views, respectively, of an alternative embodiment of a turbine configuration having outer blades 100 mounted with the convex side facing to the outside of the turbine hub and a slat 200 adjacent to the leading edge 2102. The blades 100 are connected by arms 600 to a central generator 800. The perspective view of FIG. 21B shows base 900 positioned under the generator 800.

Figure 22B:
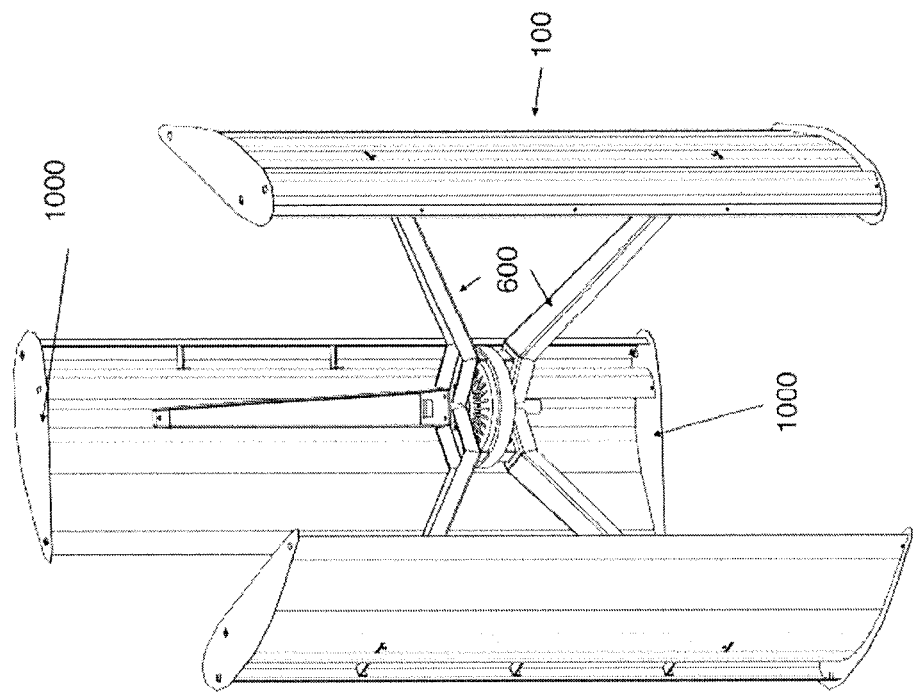
FIGS. 22A-22B depict views of an embodiment of a turbine.
Figure 22A:
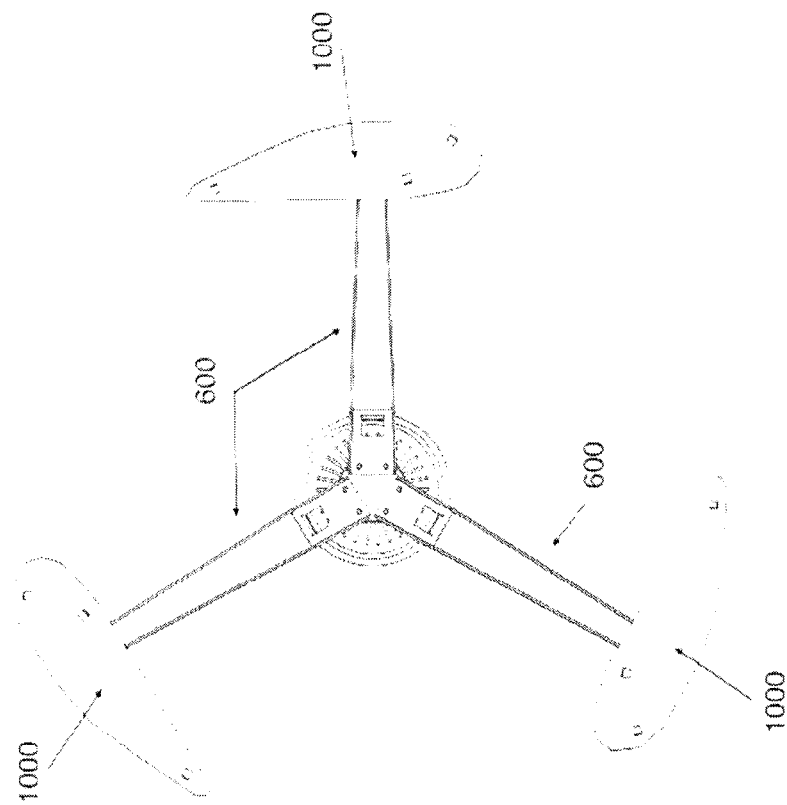

FIGS. 22A and 22B illustrate top down and perspective views, respectively, of the configuration of the blades 100 and slats 200 of FIG. 16 having winglets 1000 on the upper and lower surfaces to canalize the air flow inside the turbine and the slats 200 for increasing the power output. In other aspects, winglets are configured for other blade designs and for use with slat and flap configurations. The winglet can be attached using bolts, rivets, welding, or the like. The winglets can comprise the same materials as those described with respect to the blades. The winglets can also be positioned on only the upper surfaces or only the lower surfaces.

Figure 23A:
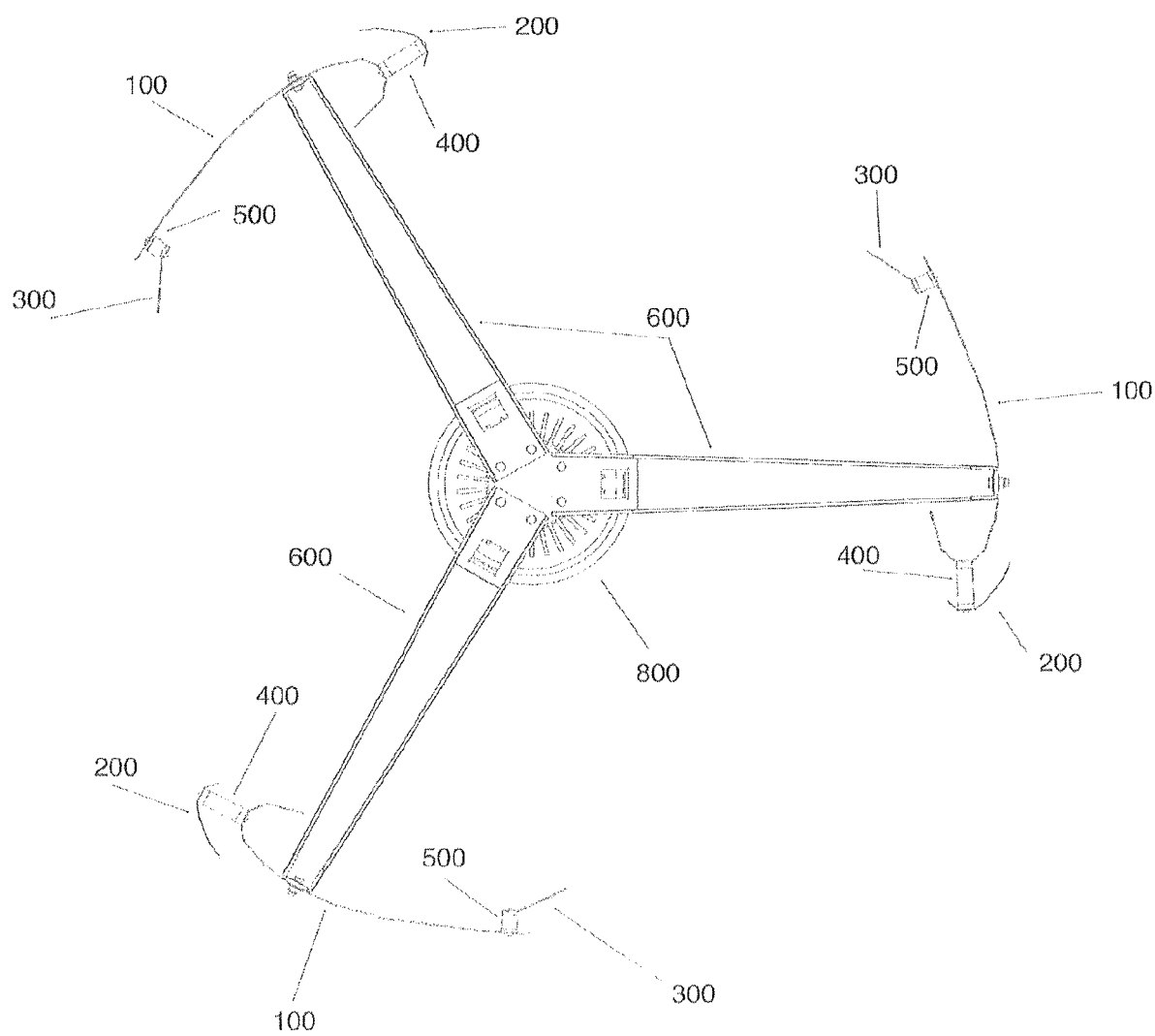
FIGS. 23A-23B illustrate views of an embodiment of a turbine.
Figure 23B:
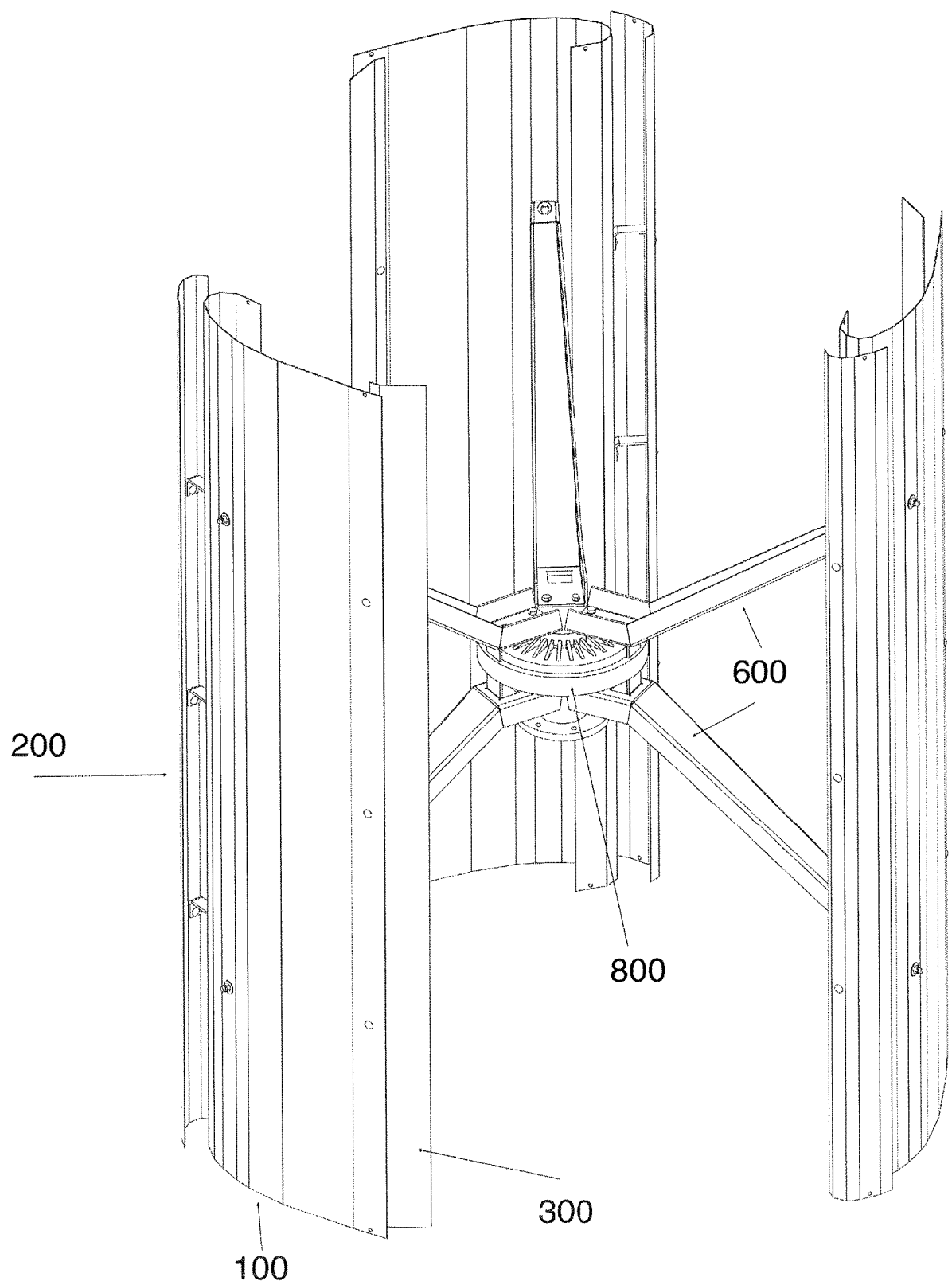

FIGS. 23A and 23B are top down and perspective views, respectively, of an embodiment of a turbine, having a 3 blade 100 configuration, with one slat 200 and a flap 300 attached to each blade 100 using bridges 400, 500. Mounting arms 600 connect each blade 600 to an axial flux alternator 800 positioned in the middle. The configuration illustrates the blades 100 distributed evenly in a concentrically array around the alternator 800.

Figure 24:
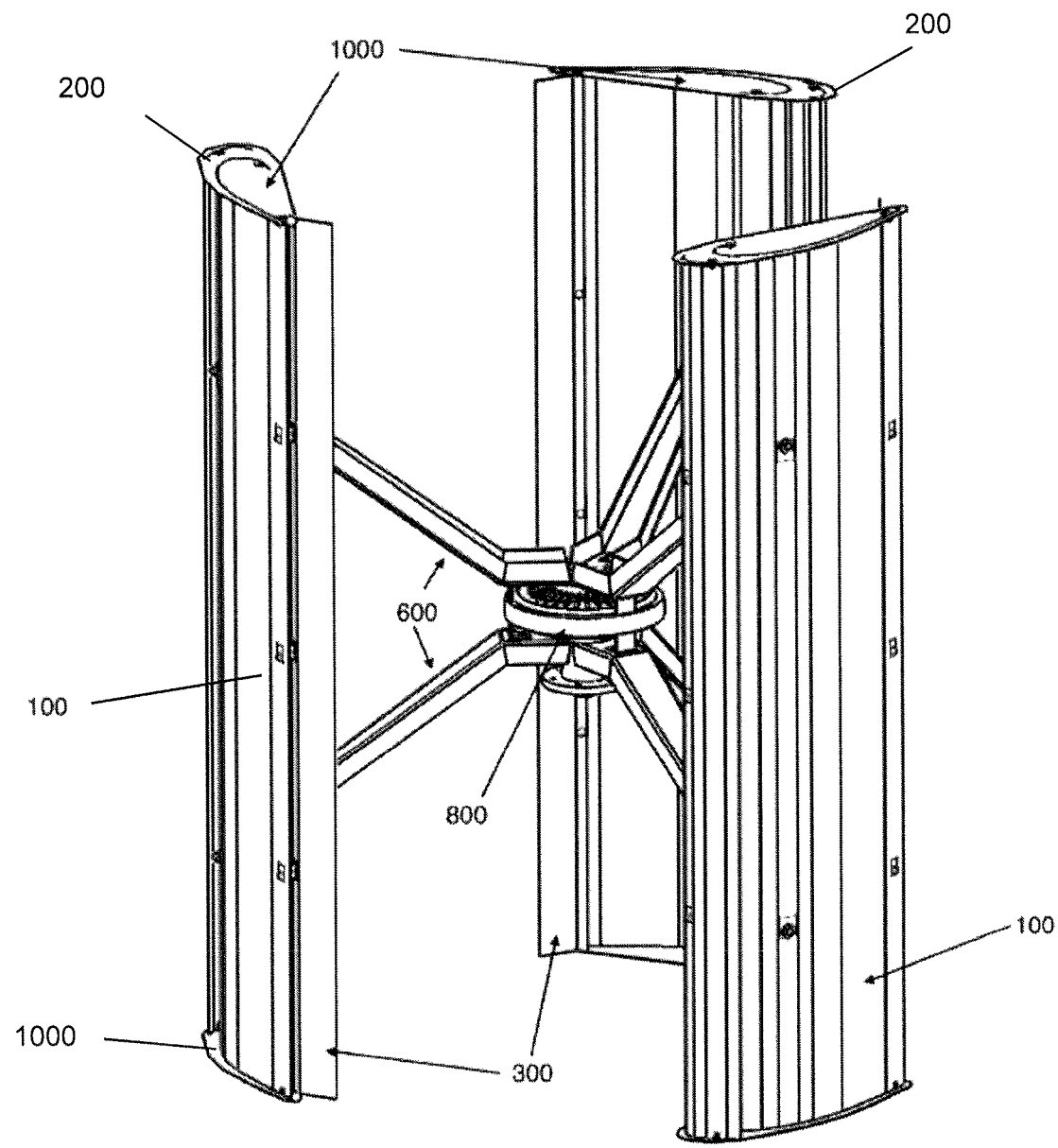
FIG. 24 shows a perspective view of an embodiment of a turbine.

FIG. 24 is a view of a turbine, similar to that shown in FIG. 22B, comprising the winglets 1000 on the upper and lower surfaces to canalize the air flow inside the turbine. The turbine comprises slats 200 and the flaps 300 connected to blades 100 for increasing the power output. Arms 500 connect blades 100 to a central generator.

Figure 25:
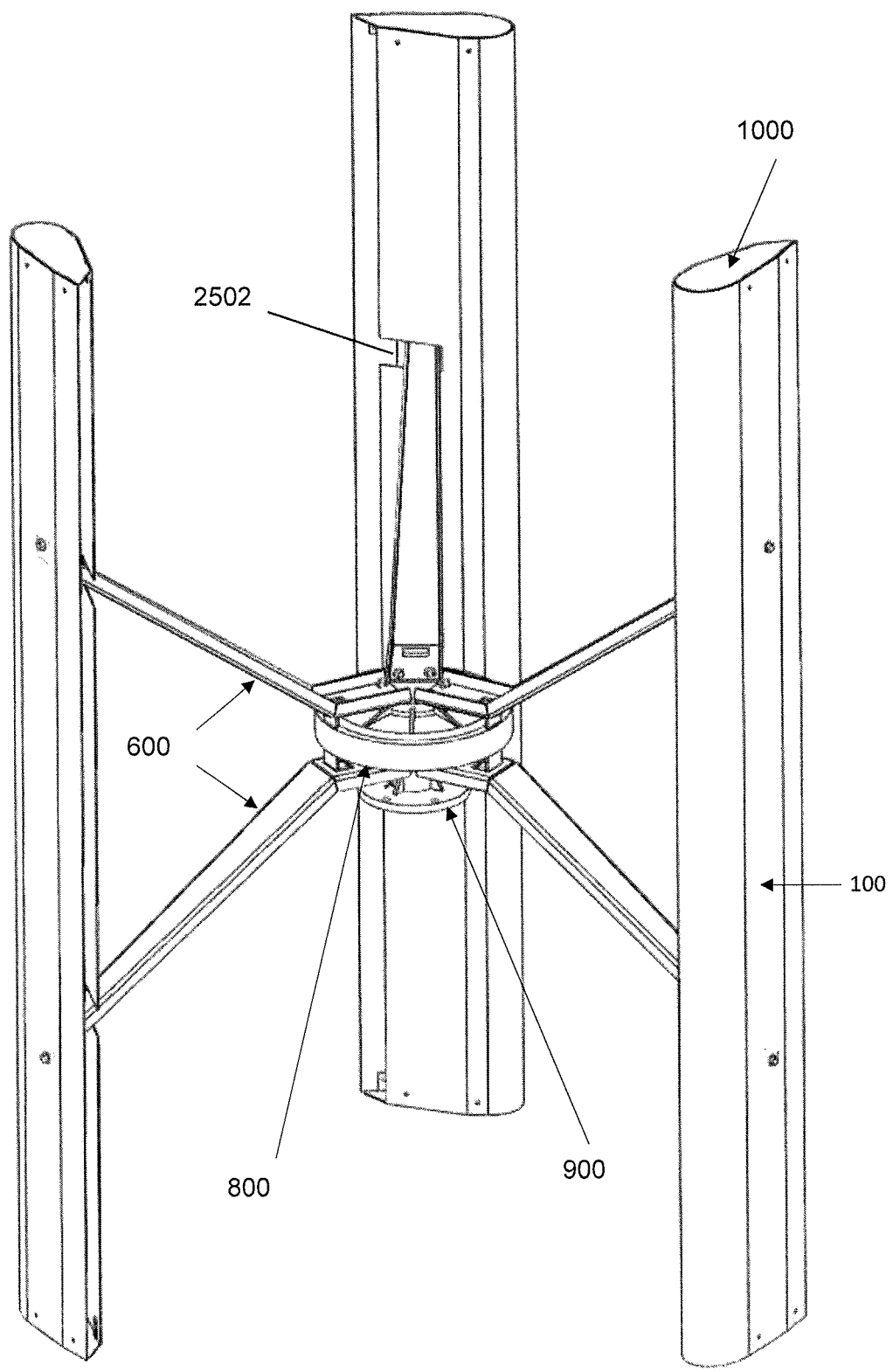
FIG. 25 depicts a perspective view of an embodiment of a turbine.

FIG. 25 is a perspective view of the complete assembly, using the blades 100 from FIG. 5. Each blade 100 comprise a winglet 1000 configured to canalize air flow inside the turbine. Arms 600 connect the blades 100 to a central generator 800 comprising base 900. As shown in FIG. 25, the blade 100 can comprise cutouts 2502 to allow for passage of the arm 600.

Figure 26:
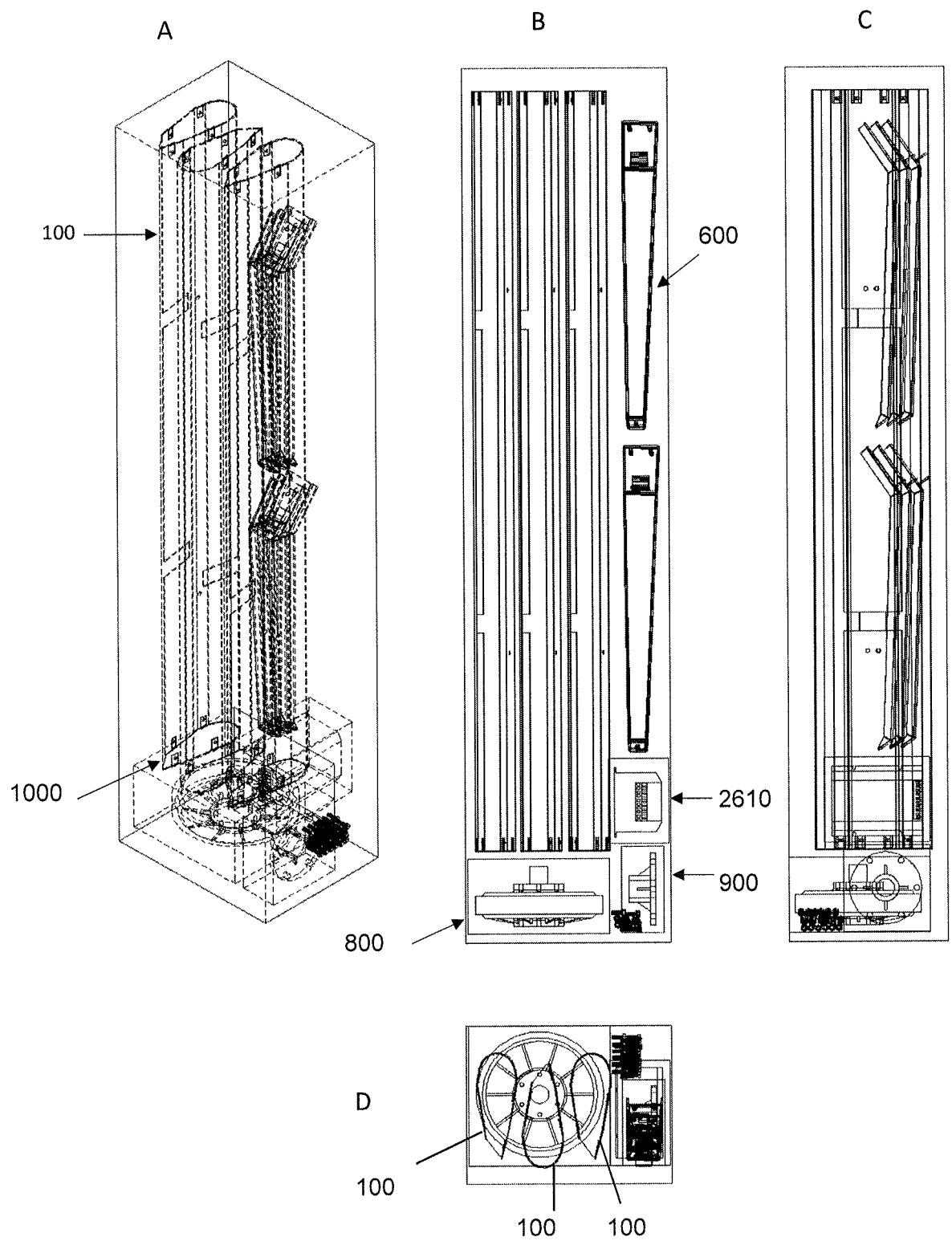
FIGS. 26A-26D illustrate schematic views of a packed turbine.

FIGS. 26A-D are schematic drawing of the turbine in FIG. 25, ready for delivering, using a flat packed array. FIG. 26A shows a perspective view of an embodiment of a container holding the blades 100 and winglets 1000. The container also includes arms 600. Generator 800 is shown positioned at the bottom of the container. FIG. 26B shows a front view of the container, showing a better view of generator 800, base 900, controller 2610. FIG. 26C shows a side view of the container. FIG. 26D shows a top view of the container.

Figure 27:
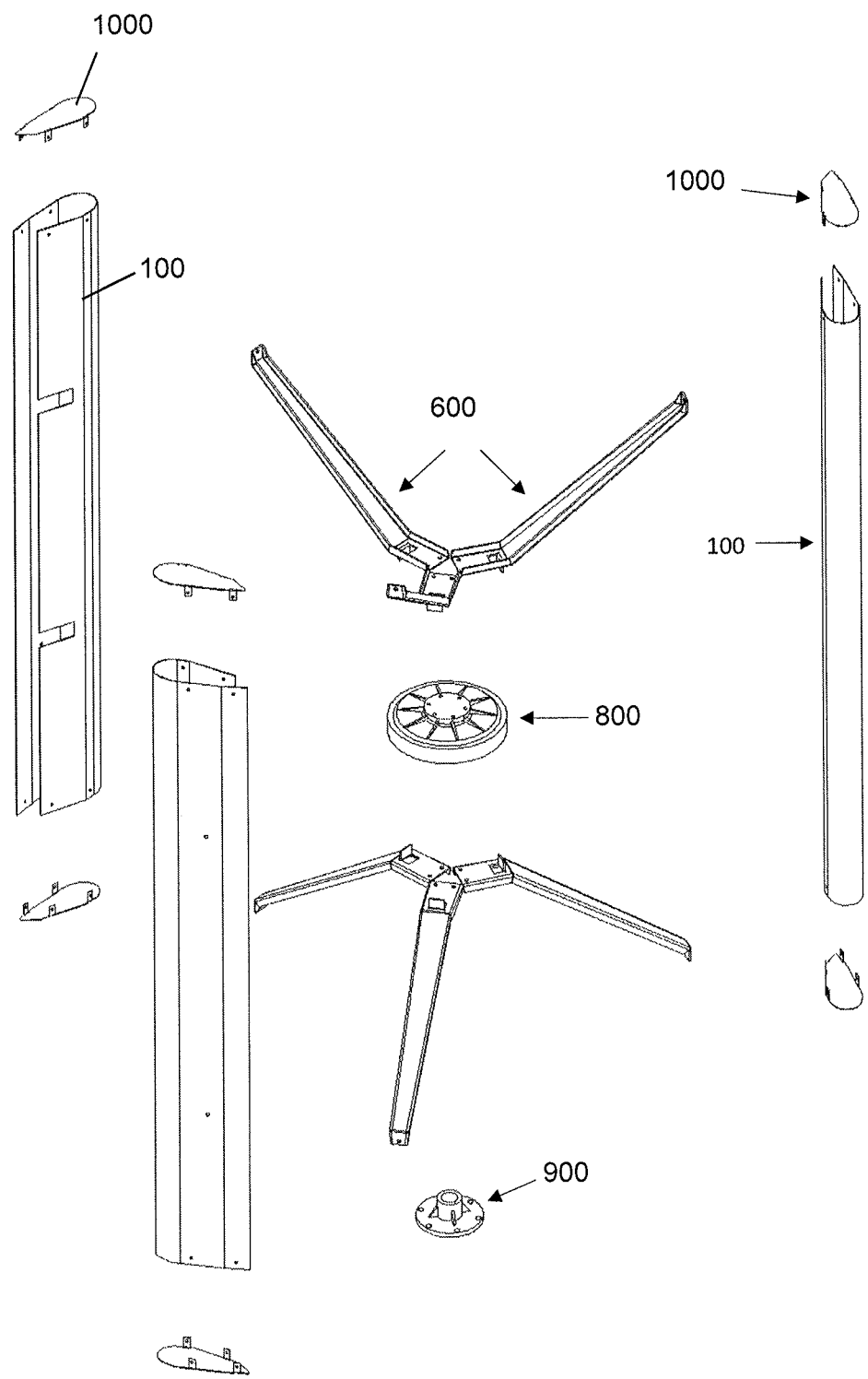
FIG. 27 shows an exploded view of the components of an embodiment of a turbine.

FIG. 27 is an exploded view of the turbine from Figure FIG. 25, showing all the components, including winglets 1000, blade 100, generator 800, base 900, and arms 600. Assembling the turbine can be a relatively simple process. The process can comprise simply connecting the parts using, for example, bolts and self-locking nuts. In some embodiments, the process uses only two tools. The completed assemblies shown herein comprise three blades, but more or fewer blades are also possible.

All wind turbines extract energy from the wind through aerodynamic forces. Wind can be defined as the air mass movement. This mass has the following kinetic energy:

$$e = \frac{1}{2} * m * v^2$$

If this air mass goes through a circular section $A_r$, flow value:

$$Q = v * A_r$$

And its kinetic energy per volume is:

$$e = \frac{1}{2} * \rho * v^2$$

The power of the wind tube, the kinetic energy flow per time:

$$P = \frac{1}{2} * \rho * v^2 * Q = \frac{1}{2} * \rho * v^3 * A_r$$

Using the area swept by the blade diameter:

$$P = c * \rho * D^2 * v^3$$

This is the wind tunnel power but it is not possible to extract all of it. Wind turbines extract energy by slowing down the wind. For a wind turbine to be 100% efficient, it would need to stop 100% of the wind; but, then the rotor would have to be a solid disk and it would not turn, resulting in no kinetic energy conversion. On the other extreme, a wind turbine with just one rotor blade would cause most of the wind to pass through the area swept by the turbine blade, missing the blade completely and missing any kinetic energy transfer from the wind.

This equation shows the wind flow maximum extractable power $$P = 0.59 * c * \rho * D^2 * v^3$$

Small wind turbines are defined by IEC as a wind turbine with a rotor swept area no greater than 200 m². Therefore, the diameter is limited to 16 m. However, most of them have much smaller diameters starting at about 1 m.

Figure 28:
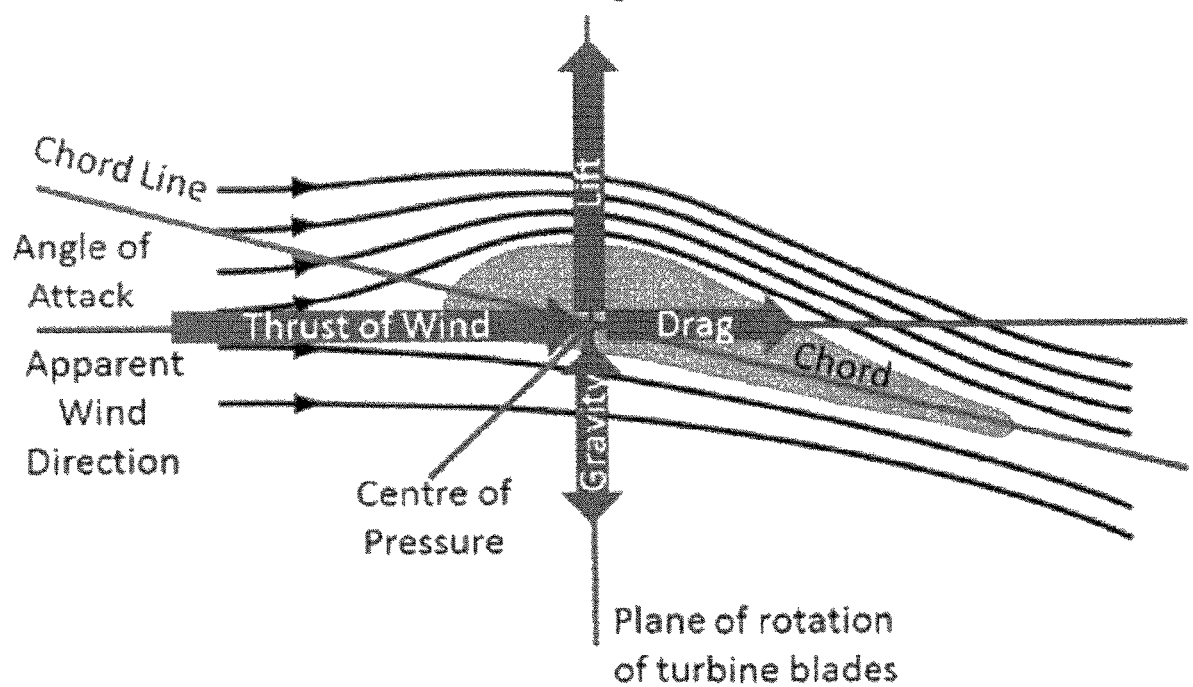
FIG. 28 depicts a graphic showing aerodynamic forces on a wind turbine blade.

There are two important aerodynamic forces: drag and lift (see FIG. 28). The former applies a force on the body in the direction of the relative flow, while the latter applies a force perpendicular to the relative flow. Many machine topologies could be classified by the primary force used to extract the energy. For example, Darrieus (Lift Force—VAWT), Propeller type (Lift Force—HAWT) and Savonius (Drag Force—VAWT) are three different implementations of wind turbines. The Propeller type wind turbine is considered a Horizontal Axis Wind Turbine (HAWT) where the propeller rotates about a horizontal axis. The Darrieus and Savonius designs are a Vertical Axis Wind Turbine (VAWT) where they rotate about a vertical axis. Drag based machines can be conceptually simple, yet suffer from poor efficiency. Efficiency in this analysis is based on the power extracted vs. the plan-form area as explained before.

Savonius turbines can be very simple turbines. Aerodynamically, they are drag-type devices. Drag is the resistance resulting from moving a rigid surface against the wind or fluid medium. The Savonius type uses a drag force to rotate about its vertical axis. Savonius type turbines are resistant to turbulence and can be mounted closer to the ground. They also do not require shifting or rotating of the turbine in order to utilize the full potential of the wind. Compared to lift-type turbines, Savonius turbines extract less of the wind's power but usually have the advantage that they are designed to be self-starting. As of the blade arrangement of Savonius wind turbines can use a differential drag to spin, much wind energy can be lost as a constant drag resists the wind turbine movement.

The Darrieus type turbine has several attractive features. The machine rotates about a vertical axis; hence, it does not need to be turned into the wind. As a result, the Darrieus type turbine is not normally self-starting. That is, if the turbine has stopped during a period of low wind speeds, it will not usually start when the wind speed increases.

Figure 29:
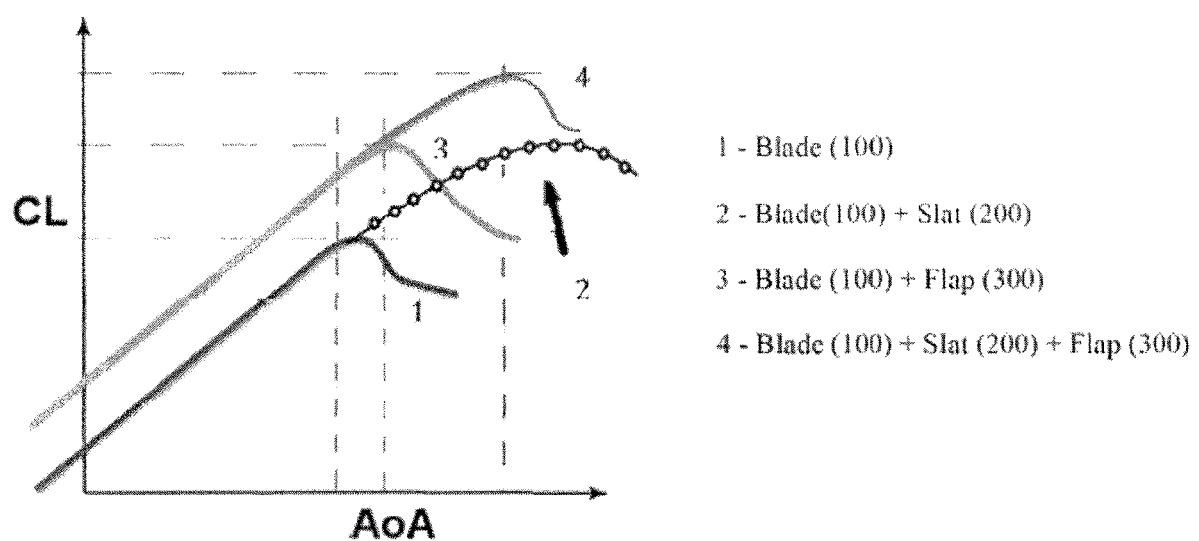
FIG. 29 illustrates a graph showing angle of attack for various wind turbine blade configurations.

The use of a slat or a flap, or a combination, with a blade blade, as described herein, permits a single turbine to operate in a wider range of wind speeds by having the slat and/or flap to take advantage of the low wind speeds and the main blade for higher wind speeds. The size, shape and relative positions of the slat to the leading edge, the use of a flap on the trailing edge of the main blade as well as, in some embodiments, the use of the winglets to canalize the air flow. The use of the slat and flap allow the turbine to produce more power increasing the angle of attack of the blade as shown in FIG. 29 provide a suitable compromise of both lift and drag turbine capabilities.

The blade, slat and flap allowing an increased maximum lift and lift-drag ratios may be attributed primarily to the increased loading carried by the slat and the forward portion of the airfoil and to the greater pressure recovery on the upper surface of the airfoil.

The slat 200 position has a number of different possible configurations. They are predefined, at certain distance of the main blade. In some embodiments, the slat to blade arrangement is fixed such that once the slat—blade orientation is settled, then the blade-slat assembly would require partial disassembly to dismantle and change the arrangement. In other embodiments, rather than a fixed slat—blade arrangement, the slat may be held in relation to a main blade with an indexed joint that permits controlled articulation of the slat into different degrees of orientation with respect to the main blade. In this way, for example, a slat-blade orientation may be adjusted within a few degrees to accommodate for prevailing winds or, optionally, to allow different slat-blade angles to be tested upon installation in order to set the proper slat-blade relationship for the prevailing winds in a particular operation site.

In some embodiments, the position of the slat relative to the blade may vary from about 0 to 12 degrees depending on wind speed and the installation site and the use of one or both of slats and flaps to provide different blade configurations to take advantage of prevailing wind conditions at the installation site. For example, for average wind speed between 1-5 m/s a slat may be fixed at an orientation of about 12 degrees relative to the chord of the blade. In another aspect, for average wind speeds between 5 to 8 m/s, a slat may be fixed at about 6 degrees relative to the chord of the blade. In still other aspects, for average wind speeds above about 8 m/s, the slat chord is aligned to the blade chord. In still other aspects, for example, in regions where the wind speed is seasonal or varying depending on time of year, the slat can be adjusted to produce the highest output for prevailing local conditions. In a similar way, flaps may be used alone or in combination with slats to enhance performance as described herein.

In some embodiments, the turbine operates in a drag force configuration at low wind speeds (e.g., about 0.5-8 MPH) and in a lift force operation at high wind speeds (e.g., about 8-130 MPH, above about 8 MPH).

The flaps 300 are shown fixed to the blade 100 to produce high power output at low winds speeds, the flaps 300 are use in average wind conditions below 11 m/s and working with the slat, increase the productive area of the blade 100 increasing the power output of the system.

In one illustrative concept, the hybrid blade design couples using leading design with traditional construction methods, for example sheet (e.g., metal sheet) bending or shaping a sheet with multiple bends to get the predefined airfoil parameters. The method can be relatively simple. Bending of sheet is a common and vital process in manufacturing industry. Sheet metal bending is the plastic deformation of the work over an axis, creating a change in the part's geometry. Similar to other sheets forming processes, bending changes the shape of the work piece, while the volume of material remains the same. In some embodiments, some portion of or all the arms 600 that unite the blades with the generator 800, the slat 200, the flaps 300 and the bridges 400 & 500 are also manufactured with sheet bending techniques. In some embodiments, the bending process can comprise curving the sheet of material. For example, a die can be added to a bender to produce a curve in a sheet of material. For example, in some embodiments, a die is used to the shape of all or a portion of the leading edge portion, the central portion or the trailing edge portion. In such embodiments, all or a portion of the blade is produced by one or more pressing or stamping processes. Others manufacturing processes can be use to achieve the same result, like 3D printing, extrusion or rolling.

Also, arms and blades can be produced with different manufacturing methods such as extrusion and 3D printing, for example.

The process of aluminum extrusion consists of designing and creating the shape of the die, a cylindrical billet of aluminum alloy is heated to 800° F.-925° F. The aluminum billet is then transferred to a loader, where a lubricant is added to prevent it from sticking to the extrusion machine, the ram or the handle. Substantial pressure is applied to a dummy block using a ram, which pushes the aluminum billet into the container, forcing it through the die. To avoid the formation of oxides, nitrogen in liquid or gaseous form is introduced and allowed to flow through the sections of the die. This creates an inert atmosphere and increases the life of the die. The extruded part passes onto a run-out table as an elongated piece that is now the same shape as the die opening. It is then pulled to the cooling table where fans cool the newly created aluminum extrusion. When the cooling is completed, the extruded aluminum is moved to a stretcher, for straightening and work hardening. The hardened extrusions are brought to the saw table and cut according to the required lengths. The final step is to treat the extrusions with heat in age ovens, which hardens the aluminum by speeding the aging process.

The last method, 3D printing or additive manufacturing is a process of making three dimensional solid objects from a digital file. The creation of a 3D printed object is achieved using additive processes. In an additive process, an object is created by laying down successive layers of material until the entire object is created. Each of these layers can be seen as a thinly sliced horizontal cross-section of the eventual object. This last method is useful to reach many places in the world; they only need the 3D file to start manufacturing.

A generator type can be selected based on the wind power to be extracted. This generator can be self-excited or permanent magnets, synchronous or asynchronous. A self-excited shunt generator or a permanent magnet generator (PMG) that does not need an external power source to excite the motor at startup. Another consideration for the generator type was whether to build a radial flux, or axial flux PMG. The radial flux would have required many concentric cylindrical parts, a cylindrical casing, cylindrical magnets, rotor etc. In an axial flux generator, the rotor is a flat disk of magnets, which rotates on a shaft above a flat ring of stator coils. In analyzing the two design types, an axial flux PMG was chosen as our final design choice for reasons of simplicity, ease of manufacturing and cost of materials. The advantageous slat-blade turbine may also be used with suitably configured other generator types as well.

As described above, in an axial flux PMG, there is a rotor mounted with a ring of magnets. The rotor is connected to the generator shaft, which is driven, in this case, by the turbine. The magnets on the rotor are arranged so that alternating north and south poles are perpendicular to the rotor's flat top and bottom faces. The rotation of the rotor causes an alternating magnetic field at a given point above or below the rotor. The alternating magnetic field from the rotor induces a voltage in the coils of the stator. The higher the number of turns in the coils, the higher the voltage that will be induced. Also, the closer the magnets are to the coils, the higher the voltage that will be induced. Finally, the faster the rotor spins, the faster the magnetic fields are switched, the higher the voltage that will be induced. Voltage is a function of speed, while current is a function of torque.

What is claimed is:

1. An airfoil for use as in a wind turbine comprising:
 a rectangular blade shaped for a vertical axis wind turbine, the blade comprising one or more sheets of material including a top edge, a bottom edge, an outer edge, an inner edge, an inner surface and an outer surface wherein the blade comprises a plurality of segments, adjacent segments comprising a bend therebetween extending from the top edge to the bottom edge, the blade comprising at least three bends, wherein the blade approximates an airfoil shape without any internal structure, the blade comprising a leading edge and a trailing edge, the leading edge comprising a portion of the outer surface including the inner edge, and the trailing edge comprising a portion of the outer surface including the outer edge, wherein the leading edge comprises more bend segments than the trailing edge.

2. The airfoil of claim 1, wherein the bends are formed by at least one of bending, bump pressing, and rolling the sheet of material.

3. The airfoil of claim 1, wherein a length from the top edge to bottom edge is about 30 cm to about 6000 cm.

4. The airfoil of claim 1, wherein the rectangular blade is formed from a single piece of material.

5. The airfoil of claim 1, wherein the blade comprises at least one of steel, aluminum, carbon fiber, fiber glass, and plastic.

6. The airfoil of claim 1, wherein the blade is formed of 2 sheets of material.

7. A wind turbine including at least one turbine blade as claimed in claim 1 mounted to a vertical rotor shaft with at least one transversely oriented strut such that an approximately curvilinear portion proximate to the outer edge defines the outer diameter of the turbine and the blade revolves about the rotor shaft.

8. The wind turbine of claim 7, wherein the rotor shaft is connected to a generator.

9. The wind turbine of claim 8, wherein the generator is a radial flux generator or an axial flux generator.

10. The airfoil of claim 1, further comprising one or more curves extending from the top edge to the bottom edge.

11. A wind turbine blade comprising:
 a blade comprising a top edge, a bottom edge, an outer edge, an inner edge wherein the blade comprises a plurality of bends or curves extending from the top edge to the bottom edge, and a plurality of bend segments, adjacent bend segments comprising curves or a bend therebetween, the plurality of bend segments forming an airfoil shape, the blade lacking any internal structure, the blade comprising a leading edge, a trailing edge, and a midsection, the leading edge comprising a portion of the blade including the inner edge, the trailing edge comprising a portion of the blade including the outer edge, and the midsection comprising a portion of the blade between the inner edge and the trailing edge, wherein the leading edge comprises more bend segments than the trailing edge.

12. A wind turbine including the wind turbine blade of claim 11 having three blades and slats arranged about a central vertical axis, wherein each of the slats are arranged relative to each of the blades so that at wind speeds below about 8 MPH (3.6 m/s), the turbine operates in a drag force configuration and then at wind speeds above, about 8 MPH (3.6 m/s), the turbine operates in a lift force operation.

13. A wind turbine including the wind turbine blade of claim 11 having three blades and slats arranged about a central vertical axis wherein each of the slats are arranged relative to each of the blades to provide a vertical turbine that generates power using drag force operation in a first range of wind speeds and generates power using lift force operation in a second range of wind speeds.

14. The wind turbine of claim 13 wherein the first range of wind speeds is about 0.5 MPH (0.22 m/s) to about 8 MPH (3.6 m/s).

15. The wind turbine of claim 13 wherein the second range of wind speeds is about 8 MPH (3.6 m/s) to about 130 MPH (58.1 m/s).

16. The wind turbine blade of claim 13, wherein a length of the blade from the upper edge to the lower edge is from about 15 inches (0.4 m) to about 20 feet (6.1 m).

17. The wind turbine blade of claim 13 wherein the blade is formed from one or more rectangular sheets having a thickness from about 0.5 mm to 15 mm.

18. The wind turbine blade of claim 13 further comprising a flap attached to a blade inner surface or a blade outer surface to position the flap in relation to the trailing edge of the blade, the flap comprising a leading edge and a trailing edge.

19. The wind turbine blade of claim 18, wherein the flap trailing edge is directed towards or away from the trailing edge of the blade.

20. The wind turbine blade of claim 18, wherein the flap trailing edge is directed towards or away from the central vertical axis of the turbine.

21. A vertical wind turbine comprising the vertical wind turbine blade of claim 13, comprising three blades, a generator hub, supporting hardware to secure the three blades about the generator wherein each of the three turbine blades are formed from rectangular material having a length of about 30 to 6000 mm arranged in an enclosure having a volume of no more than 15 cubic meters.

22. The vertical wind turbine of claim 21, wherein the enclosure has a length, width and height not to exceed 6000 mm.

23. The vertical wind turbine of claim 21, wherein the enclosure is a flat-packed array.

24. A method for producing a wind turbine blade comprising
 providing a sheet of material having a top edge, a bottom edge, an outer edge, an inner edge, an inner surface and an outer surface; and
 forming at least three bends extending from the top edge to the bottom edge so that the bent sheet of material approximates an airfoil shape without any internal structure.

25. The method of claim 24, wherein forming the bends comprises at least one of bending, bump pressing, and rolling the sheet of material.

26. The method of claim 24, wherein forming the bends comprise forming an angle of less than about 20 degrees.

27. The method of claim 24, further comprising assembling the vertical wind turbine blade with other components to form a vertical wind turbine.

28. The method of claim 27, wherein the assembling comprises connecting the components.

29. The method of claim 27, wherein the components are provided in a flat-packed container.

30. A method of manufacturing one or more blades for a wind turbine, comprising selecting a sheet of material having a length and width sized for producing a wind turbine blade having a blade height approximately equal to the length of the sheet and a blade width about 50-90% of the width of the sheet;

creating a series of at least one of bends and curves positioned along the width of the sheet and extending along the length of the material in the sheet of material to form a leading edge of the turbine blade in the sheet of material and such that the blade approximates an airfoil shape; and repeating the selecting and creating until a desired number of blades are formed.

\* \* \* \* \*